(12) United States Patent
Mabara et al.

(10) Patent No.: US 11,363,155 B2
(45) Date of Patent: Jun. 14, 2022

(54) IMAGE READING DEVICE AND IMAGE FORMING APPARATUS

(71) Applicant: FUJIFILM BUSINESS INNOVATION CORP., Tokyo (JP)

(72) Inventors: Tsuyoshi Mabara, Kanagawa (JP); Ken Kobayashi, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 16/944,969

(22) Filed: Jul. 31, 2020

(65) Prior Publication Data

US 2021/0250460 A1    Aug. 12, 2021

(30) Foreign Application Priority Data

Feb. 6, 2020  (JP) .............................. JP2020-018454
Mar. 2, 2020  (JP) .............................. JP2020-035253
Mar. 2, 2020  (JP) .............................. JP2020-035294

(51) Int. Cl.
*H04N 1/04* (2006.01)
*H04N 1/00* (2006.01)

(52) U.S. Cl.
CPC ....... *H04N 1/00814* (2013.01); *H04N 1/0066* (2013.01)

(58) Field of Classification Search
CPC .................. H04N 1/00814; H04N 1/0066
See application file for complete search history.

(56) References Cited

U.S. PATENT DOCUMENTS

| | | | |
|---|---|---|---|
| 5,621,501 A | 4/1997 | Matsuo et al. | |
| 2019/0170181 A1* | 6/2019 | Hino | .................. H04N 1/00554 |

FOREIGN PATENT DOCUMENTS

| | | |
|---|---|---|
| JP | 2832137 B2 | 12/1998 |
| JP | H11-038714 A | 2/1999 |
| JP | 2008-191197 A | 8/2008 |
| JP | 5594905 B2 | 9/2014 |

* cited by examiner

*Primary Examiner* — Moustapha Diaby
(74) *Attorney, Agent, or Firm* — Oliff PLC

(57) ABSTRACT

Provided is an image reading device including: a document pressing portion that is attached to an apparatus body and configured to open or close to the apparatus body to press a document in between; and an opening force applying unit that applies a drive force of a drive source to the document pressing portion as an opening force to open the document pressing portion temporarily in a period of opening the document pressing portion.

5 Claims, 29 Drawing Sheets

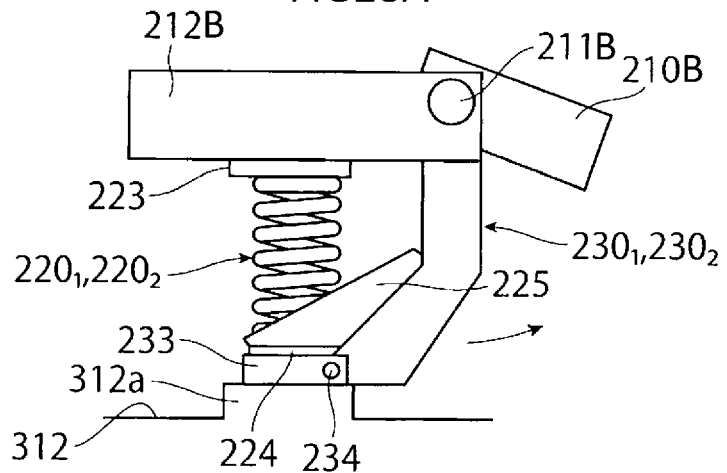
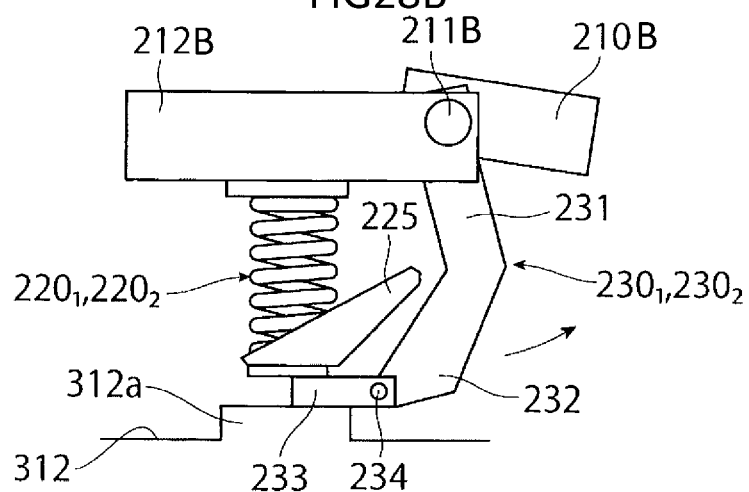
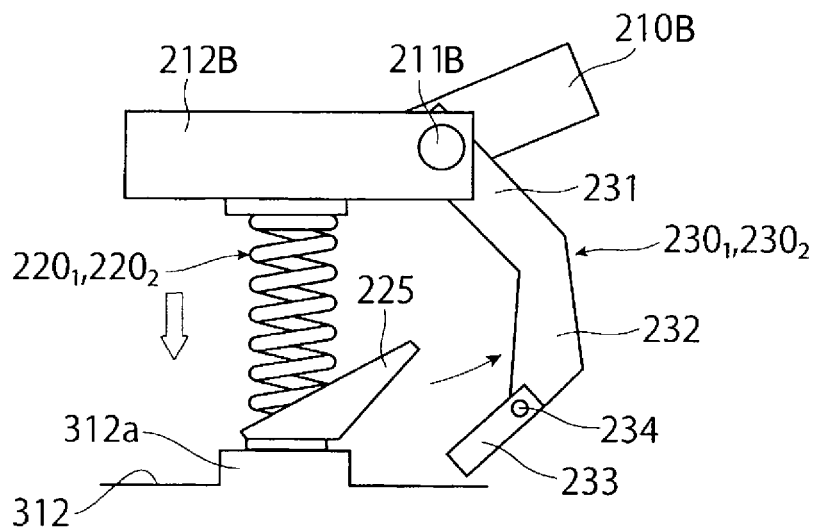

IMAGE READING DEVICE AND IMAGE FORMING APPARATUS

CROSS-REFERENCE TO RELATED APPLICATIONS

This application is based on and claims priorities under 35 USC 119 from Japanese Patent Application No. 2020-018454 filed on Feb. 6, 2020, Japanese Patent Application No. 2020-035253 filed on Mar. 2, 2020 and Japanese Patent Application No. 2020-035294 filed on Mar. 2, 2020.

BACKGROUND

Technical Field

The present invention relates to an image reading device and an image forming apparatus.

Related Art

In a related art, for example, techniques disclosed in Patent Literatures 1 to 3 and the like have already been proposed as techniques related to an image reading device.

An image reading device disclosed in Patent Literature 1 includes: a mounting table glass on which a sheet is mounted; an openable and closable sheet pressing portion that presses the sheet placed on the placing table glass from above; an image reading unit that reads an image of the sheet while the sheet is pressed from above by the sheet pressing portion; an electric opening and closing unit that assists manual opening and closing of the sheet pressing portion; a speed changing unit that changes an opening and closing speed of the sheet pressing portion opened and closed by the electric opening and closing unit according to an external force applied to the sheet pressing portion when the sheet pressing portion is manually opened and closed; an opening and closing angle detection unit that detects an opening and closing angle of the sheet pressing portion; and an opening and closing speed setting unit that determines, based on a detection signal from the opening and closing angle detection unit, whether the sheet pressing portion is in a first region in which the opening and closing speed is changed according to the external force, in a second region immediately before being completely closed, or in a third region immediately before being completely opened, that changes the opening and closing speed according to the external force when determining that the sheet pressing portion is in the first region, and that sets the opening and closing speed to a preset opening and closing speed regardless of the external force when determining that the sheet pressing portion has moved to the second region or the third region.

Patent Literature 2 discloses a duplex automatic document feeder that is rotatably supported above an image reading unit via a hinge portion and conveys a document to a document placing table provided on an upper surface of the image reading unit. The duplex automatic document feeder includes a document feed tray, a document discharge tray provided below the document feed tray, and a document conveying path that is provided on the document feed tray and a side of the document feed tray and is for conveying a document from the document feed tray to the document discharge tray. A grip-shaped grip portion is provided on a side surface of the duplex automatic document feeder facing the document conveying path on a rotary end side, at a position that does not vertically overlap with an operation portion protruding from the image reading unit to the rotary end side.

Patent Literature 3 discloses an image forming apparatus including an image reading device in an upper frame that is mounted above a body frame including a recording unit so as to be openable and closable via a hinge. Between the upper frame and the body frame, a stretchable elastic biasing member is provided on one side and a spring member is interposed on the other side.

CITATION LIST

Patent Literature

Patent Literature 1: JP-A-2008-191197
Patent Literature 2: Japanese Patent No. 5594905
Patent Literature 3: JP-A-11-38714

SUMMARY

Aspects of non-limiting embodiments of the present disclosure relate to provide an image reading device and an image forming apparatus with which an operation force is reduced when a document pressing portion is opened without impairing operability, as compared with a case in which opening and closing drive is performed over all opening and closing angles of the document pressing portion.

Another aspect of non-limiting embodiments of the present disclosure relate to an image reading device and an image forming apparatus with which an operation force may be reduced when a document pressing unit is opened with a simple configuration, as compared with a case in which a spring member is simply interposed between the document pressing unit and an apparatus body.

Aspects of certain non-limiting embodiments of the present disclosure address the advantages discussed above and/or other advantages not described above. However, aspects of the non-limiting embodiments are not required to address the above advantages, and aspects of the non-limiting embodiments of the present disclosure may not address advantages described above.

According to an aspect of the present disclosure, there is provided an image reading device including:

a document pressing portion that is attached to an apparatus body and configured to open or close to the apparatus body to press a document in between; and an opening force applying unit that applies a drive force of a drive source to the document pressing portion as an opening force to open the document pressing portion temporarily in a period of opening the document pressing portion.

BRIEF DESCRIPTION OF DRAWINGS

Exemplary embodiment(s) of the present invention will be described in detail based on the following figures, wherein: wherein:

FIG. 28A is a configuration views illustrating a main part of the duplex automatic document feeder according to the fourth exemplary embodiment of the present invention;

FIG. 28B is a configuration view illustrating a main part of the duplex automatic document feeder according to the fourth exemplary embodiment of the present invention;

FIG. 28C is a configuration view illustrating a main part of the duplex automatic document feeder according to the fourth exemplary embodiment of the present invention;

DETAILED DESCRIPTION

Hereinafter, an exemplary embodiment of the present invention will be described with reference to the drawings.

First Exemplary Embodiment

Figure 1:
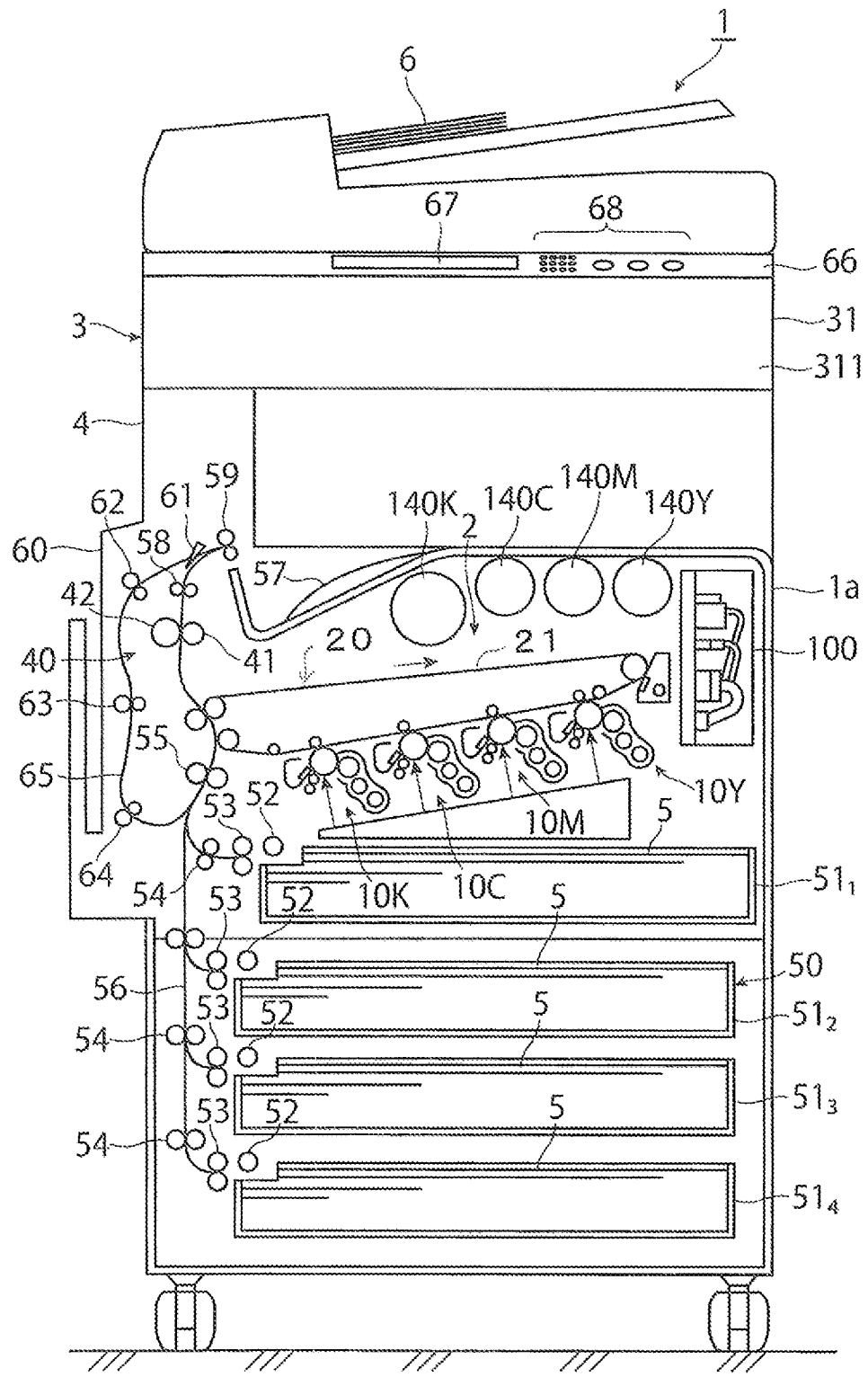
FIG. 1 is an overall configuration view illustrating an image forming apparatus to which an image reading device according to a first exemplary embodiment of the present invention is applied.

FIG. 1 is a configuration view illustrating an overall outline of an image forming apparatus to which an image reading device according to the first exemplary embodiment of the present invention is applied.

<Overall Configuration of Image Forming Apparatus>

An image forming apparatus 1 according to the first exemplary embodiment is, for example, a color copying machine. The image forming apparatus 1 includes an image reading device 3 as an example of an image reading unit configured to read images of documents 6, and an image forming unit 2 as an example of an image forming unit configured to form an image on a recording medium based on image data read by the image reading device 3 or the like. The image reading device 3 is provided above an apparatus body 1a housing the image forming unit 2 and is supported by a support portion 4. A space for ejecting a recording medium on which an image has been formed is formed between the image reading device 3 and the apparatus body 1a.

As illustrated in FIG. 1, the image reading device 3 is provided with, on an upper part of a front wall 311 located on a front surface of a housing 31, a control panel 66 as an operation portion configured to operate the image forming apparatus 1 and the image reading device 3. The control panel 66 includes a touch panel 67 that serves as a display unit configured to display an operation menu, a warning, a message, and the like for an operator (a user) and is configured to receive various settings for the displayed operation menu and the like, and a plurality of operation buttons 68.

The image forming unit 2 includes a plurality of image forming devices 10 configured to form a toner image to be developed with a toner which is a developer, an intermediate transfer device 20 configured to hold the toner image formed by each image forming device 10 and to finally convey the toner image to a secondary transfer position where the toner image is secondarily transferred to a recording sheet 5 which is an example of a recording medium, a sheet feeding device 50 configured to house and convey the required recording sheet 5 to be supplied to the secondary transfer position of the intermediate transfer device 20, a fixing device 40 configured to fix the toner image on the recording sheet 5 secondarily transferred by the intermediate transfer device 20, and the like. The apparatus body 1a includes a support structure member, an exterior cover, and the like. The image forming unit 2 is not limited to use an electrophotographic method, and may use another method which is an inkjet method, a thermal head method, a lithography method, or the like as long as an image may be formed on a recording medium.

The sheet feeding device 50 is provided at a position below the image forming device 10. The sheet feeding device 50 mainly includes a plurality of (or a single) sheet housing bodies $51_1$ to $51_4$ configured to house the recording sheets 5 of a desired size, a desired type, and the like in a stacked state, and delivery devices 52, 53 configured to deliver the recording sheets 5 one by one from the sheet housing bodies $51_1$ to $51_4$. The sheet housing body 51 is attached, for example, so as to be pulled out to a front surface (a side surface that an operator faces during operation) side of the apparatus body 1a.

A plurality of sheet conveying rollers 54, 55 configured to convey the recording sheet 5 delivered from the sheet feeding device 50 to the secondary transfer position and a sheet feeding conveyance path 56 including a conveyance guide (not illustrated) are provided between the sheet feeding device 50 and the intermediate transfer device 20. The sheet conveying roller 55 provided immediately before the secondary transfer position in the sheet feeding conveyance path 56 is, for example, a roller (a registration roller) configured to adjust a timing of conveying the recording sheet 5. Further, a conveying roller 58 and an ejecting roller 59 configured to eject the recording sheet 5 to an ejection housing portion 57 provided in an upper part of the apparatus body 1a are provided downstream of the fixing device 40 in a sheet conveying direction.

The image forming apparatus 1 further includes a duplex unit 60 configured to form images on both sides of the recording sheet 5. When the recording sheet 5 on which an image is formed on one side of the recording sheet 5 is conveyed to the ejection housing portion 57 by the ejecting roller 59, the duplex unit 60 introduces the recording sheet 5 through a switching gate 61 by rotating the ejecting roller 59 to a reverse direction while the ejecting roller 59 holds a rear end of the recording sheet 5. The duplex unit 60 includes a plurality of conveying rollers 62 to 64 configured to convey the introduced recording sheet 5 in a state in which front and back sides are reversed, and a duplex conveyance path 65 including a conveyance guide (not illustrated).

The recording sheet 5 on which an image has been formed is ejected by the conveying roller 58 and the ejecting roller 59 to, for example, the ejection housing portion 57 provided in the upper part of the apparatus body 1a.

When an image is formed on both sides of the recording sheet 5 and when the recording sheet 5 on which an image is formed on one side of the recording sheet 5 is conveyed to the ejection housing portion 57 by the ejecting roller 59, a rotation direction of the ejecting roller 59 is switched to a reverse direction while the ejecting roller 59 holds the rear end of the recording sheet 5. A conveying direction of the recording sheet 5 conveyed in the reverse direction by the ejecting roller 59 is switched to a duplex unit 60 side by the switching gate 61. Thereafter, the recording sheet 5 is conveyed to the sheet conveying roller 55 in a state in which the front and back sides are reversed through the duplex conveyance path 65 including the conveying rollers 62 to 64 and the like. The sheet conveying roller 55 sends and feeds the recording sheet 5 to the secondary transfer position according to a transfer timing. A toner image is secondarily transferred from an intermediate transfer belt 21 to a back surface (a second surface) of the recording sheet 5. The recording paper 5 is subjected to fixing processing performed by the fixing device 40, and is ejected by the ejecting roller 59 into the ejection housing portion 57 provided in the upper part of the apparatus body 1a with the second surface of the recording sheet 5 facing downward.

<Configuration of Image Reading Device>

Figure 2:
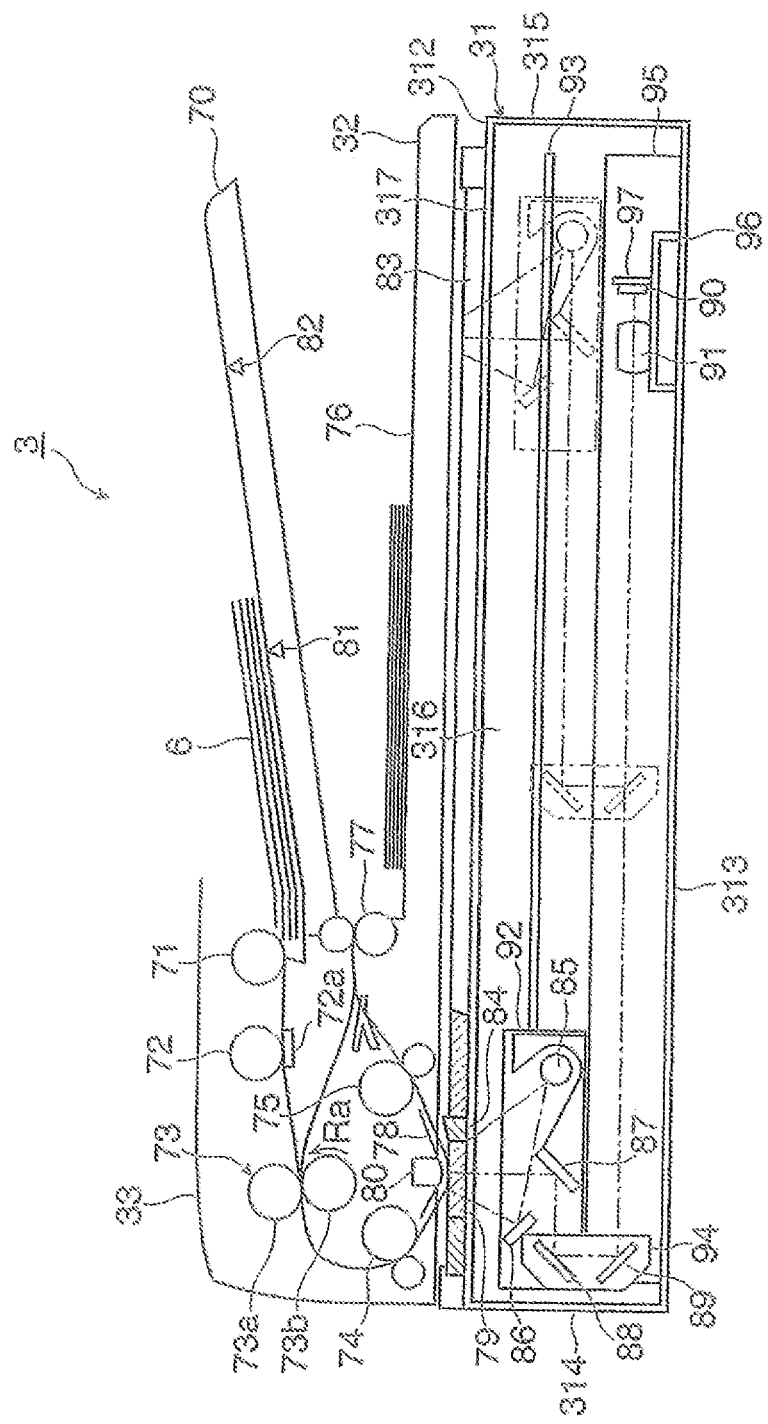
FIG. 2 is a configuration view illustrating the image reading device according to the first exemplary embodiment of the present invention.

FIG. 2 is a schematic configuration view illustrating a configuration of the image reading device according to the first exemplary embodiment.

The image reading device 3 roughly includes a housing 31 as an example of a device body of the image reading device 3 including a document reading surface (a support surface) formed on an upper end surface of the housing 31, and a duplex automatic document feeder (DADF) 33 that is attached to the housing 31 so as to be openable and closable and serves as an example of a document pressing portion configured to press the documents 6. The duplex automatic document feeder 33 is provided with a document pressing cover 32. The document pressing portion is not limited to the duplex automatic document feeder 33, and may be the document pressing cover 32 itself not including the duplex automatic document feeder 33.

The duplex automatic document feeder 33 includes a plurality of conveyance members configured to convey the documents 6, a drive motor as a drive source configured to drive the plurality of conveyance members, and the like, so as to separate and convey the documents 6 set (placed) on the duplex automatic document feeder 33 one by one to a reading position when the duplex automatic document feeder 33 is closed with respect to the image reading device 3. Therefore, the duplex automatic document feeder 33 tends to be heavy (increased in weight) as a whole. The drive source configured to drive the conveyance member of the duplex automatic document feeder 33 is energized when the duplex automatic document feeder 33 is closed. However, the energization may be cut off when the conveyance member starts to be opened such that the conveyance member is not driven when the duplex automatic document feeder 33 is open.

The image reading device 3 may automatically switch between a first reading mode for reading images of the documents 6 while the documents 6 are automatically conveyed one by one by the duplex automatic document feeder 33, and a second reading mode for reading images of the documents 6 that are placed on a document table 83 (described later) and are pressed by the document pressing cover 32. FIG. 2 illustrates a state of each member at a time of reading a document in the first reading mode.

The duplex automatic document feeder 33 includes a document conveyance mechanism. The document conveyance mechanism includes a document housing portion 70 as an example of a sheet stacking portion capable of stacking and housing a plurality of the documents 6 in a state in which a reading surface (a first surface) of each document 6 faces upward, a nudger roller 71 as an example of a sending unit configured to send the documents 6 from the document housing portion 70, a feed roller 72 as an example of a sending unit configured to separate and feed the documents 6 sent by the nudger roller 71 one by one, a pressing pad 72a pressed by the feed roller 72 to separate the documents 6 one by one, a first conveying roller 73 configured to convey the documents 6 to a reading position, conveying rollers 74, 75 configured to convey the documents 6 conveyed by the first conveying roller 73 such that the documents 6 pass through the reading position, and an ejecting roller 77 as an example of a second conveying roller configured to eject the documents 6 to an ejection housing portion 76. The nudger roller 71, the feed roller 72, the conveying rollers 73 to 75, and the ejecting roller 77 are driven when the documents 6 are read. The first conveying roller 73 is a registration roller configured to adjust a timing of conveying the documents 6 to a reading position. Although not explicitly described as a roller pair in the first exemplary embodiment, terms of the conveying roller and the ejecting roller include a pair of rollers.

The first conveying roller 73 also functions as a correction unit configured to mechanically correct inclination of the documents 6 with respect to a conveying direction (hereinafter referred to as "skew correction") and corrects edges of the documents 6 in the same direction as the conveying direction. As illustrated in FIG. 2, a conveying roller 73b serving as a driving roller in the first conveying rollers 73 is driven so as to rotate in a normal rotation direction Ra of the drawing at a predetermined timing from a stopped state using a drive motor or the like as a drive unit. A conveying roller 73a, which is a driven roller, rotates according to the transport roller 73b while being in pressure contact with the conveying roller 73b.

While the conveying roller 73b serving as a drive roller is stopped, a front end of each document 6 conveyed by the upstream feed roller 72 in a conveying direction of the documents 6 abuts against a pressure contact portion between the conveying roller 73b and the conveying roller 73a. The first conveying roller 73 bends a front end region of each document 6 so that the front end of each document 6 coincides with an axial direction of the first conveying roller 73, and then starts to convey the documents 6 to perform skew correction.

The duplex automatic document feeder 33 includes a curved reading guide 78 configured to guide the documents 6 to a reading position and to guide the documents 6 in an ejection direction from the reading position, a back surface support member 80 that is provided above a reading window 79 and is provided on the reading guide 78 to support a back surface of each document 6, a first size detection sensor 81 that is provided in the document housing portion 70 to detect a size of each document 6 in a sub-scanning direction, and a second size detection sensor 82 that is also provided in the document housing portion 70 to detect a size of each document 6 in the sub-scanning direction.

The housing 31 of the image reading device 3 is formed as a rectangular parallelepiped box body including a partially opened upper end surface. The housing 31 includes an upper wall 312 facing the document pressing cover 32, a bottom wall 313 facing the upper wall 312, a side wall 314 and a side wall 315 that face each other in the sub-scanning direction (a left-right direction in FIG. 2) with the bottom wall 313 interposed therebetween, the above-described front wall 311 (see also FIG. 1), and a rear wall 316 facing the front wall 311 in a main scanning direction (a direction orthogonal to a paper surface of FIG. 2).

A large opening 317 having a rectangular shape in a plane is formed on the upper wall 312 of the housing 31 at a part corresponding to a document reading position of the documents 6 read in the second reading mode. A transparent document table 83 (a platen glass) configured to support the documents 6 is provided at the opening 317. A transparent reading window 79 configured to allow the documents 6 to be read in the first reading mode is provided on a duplex automatic document feeder 33 side of the document table 83. A guide member 84 whose upper end surface is inclined is provided between the reading window 79 and the document table 83 to guide the documents 6 that have passed through a reading position to the conveying roller 75 in the first reading mode.

The image reading device 3 includes an image reading unit. The image reading unit includes, in the housing 31, a light source 85 as an example of an illumination unit that includes an illumination lamp, an LED, or the like and is configured to emit light for illuminating the documents 6, a reflector 86 configured to reflect a part of light emitted from the light source 85 toward the documents 6, a first mirror 87 configured to receive reflected light from the documents 6, a second mirror 88 configured to receive reflected light from the first mirror 87, a third mirror 89 configured to receive reflected light from the second mirror 88, and an image forming lens 91 configured to form, with reflected light from the third mirror 89, an image on an image reading element 90 as an example of an image reading unit including a charge-coupled device (CCD), a complementary metal oxide semiconductor (CMOS), or the like. The light source 85 emits light toward the documents 6 and the reflector 86. The first to third mirrors 87 to 89 and the image forming lens 91 constitute a reading optical system configured to read images of the documents 6 with the image reading element 90.

The light source 85, the reflector 86, and the first mirror 87 are provided along the main scanning direction, which is a depth direction of the image reading device 3, and are attached to a first moving body 92 including a carriage that is movable by a drive source (described later) along the sub-scanning direction which is a width direction of the image reading device 3. The first moving body 92 is guided by a first rail 93. The first movable body 92 illuminates a reading target region of the documents 6 while moving along the sub-scanning direction, and reflects reflected light of the documents 6 toward the second mirror 88 of a second moving body 94 by the first mirror 87. The first rail 93 is provided on the rear wall 316 of the housing 31 along the sub-scanning direction.

The second mirror 88 and the third mirror 89 are provided along the main scanning direction, and are attached to the second moving body 94 including a carriage that is movable by a drive unit along the sub-scanning direction. The second moving body 94 reflects the reflected light of the documents 6 toward the image forming lens 91 of the image reading unit while being guided by a second rail 95 and moving in the sub-scanning direction. The second rail 95 is provided on the bottom wall 313 of the housing 31 along the sub-scanning direction. One first rail 93 and one second rail 95 face each other at both ends of the first rail 93 and both ends of the second rail 95 along the main scanning direction.

Figure 9:
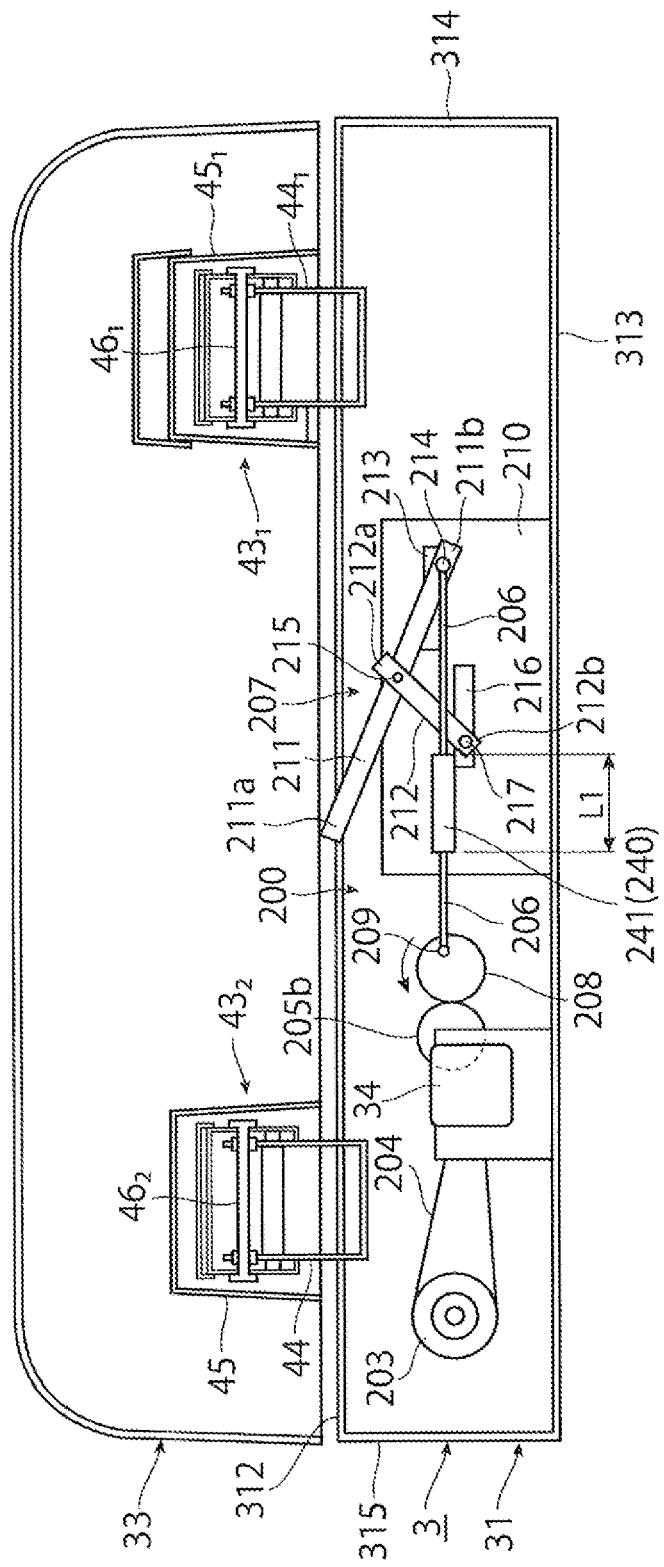
FIG. 9 is a configuration view illustrating a main part of the duplex automatic document feeder according to the first exemplary embodiment of the present invention.

As illustrated in FIG. 9, the first and second moving bodies 92, 94 are driven by a drive motor 34, which is an example of a drive source provided inside the housing 31 of the image reading device 3, so as to reciprocate along the sub-scanning direction via a drive pulley, a drive wire (not illustrated), and the like.

As illustrated in FIG. 2, the image reading unit includes an image reading board 97 on which the image reading element 90 is mounted. The image forming lens 91 and the image reading board 97 are attached to a base plate 96 supported on the bottom wall 313. Reflected light from the third mirror 89 passes through the image forming lens 91, so that an image is formed on the image reading element 90 including the CCD, the CMOS, and the like. The image reading unit reads images of the documents 6 by the image reading element 90 and outputs image data. The image data read by the image reading element 90 is subjected to predetermined image processing which is shading correction and the like as necessary by an image processing device (not illustrated), and is sent to a control device 100 (see FIG. 1).

In the first reading mode, as indicated by a solid line in FIG. 2, in a state in which the first moving body 92 and the second moving body 94 are stopped at a reading position set at a left end of the housing 31, the documents 6 are automatically conveyed by the duplex automatic document feeder 33, the documents 6 passing above the reading window 79 is illuminated by the light source 85, and images of reflected light from the documents 6 are reflected by the first mirror 87 to the image forming lens 91 via the second and third mirrors 88, 89. The image reading unit forms images of reflected light from the third mirror 89 on the image reading element 90 by the image forming lens 91, reads images of the documents 6 by the image reading element 90, and outputs image data from the image reading element 90.

On the other hand, in the second reading mode, the first moving body 92 and the second moving body 94 are driven by a drive source (described later). While the first moving body 92 moves along the sub-scanning direction, a movement amount of the second moving body 94 is ½ of a movement amount of the first moving body 92 such that an optical path length from an image reading position of the documents 6 to the image reading element 90 does not change. In FIG. 2, a two-dot chain line indicates positions of the first moving body 92 and the second moving body 94 when the first moving body 92 has moved near an end of the document 6 in the sub-scanning direction.

Figure 3:
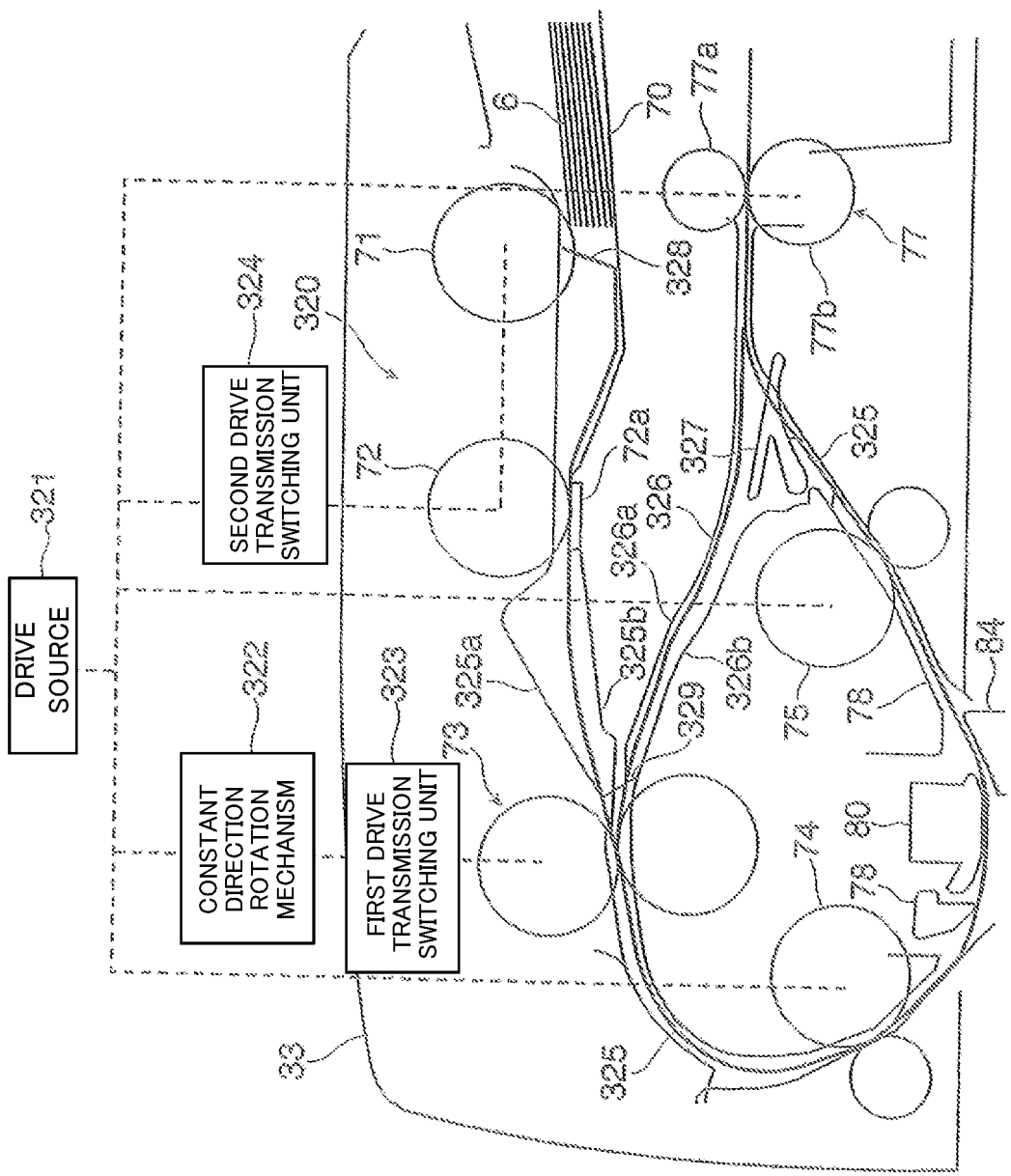
FIG. 3 is a configuration view illustrating a duplex automatic document feeder according to the first exemplary embodiment of the present invention.

As illustrated in FIG. 3, the image reading device 3 includes a sheet conveyance device 320 configured to separate the documents 6 which are an example of sheets stored in the document housing portion 70 and convey the documents 6 to a reading position one by one, and to switch back the sheets that have passed through the reading position and convey the sheets to the reading position again in a state in which the front and back sides of the sheets are reversed. The sheet conveyance device 320 includes the nudger roller 71, the feed roller 72, the pressing pad 72a, the first conveying roller 73, the conveying rollers 74, 75, the ejecting roller 77, a drive motor 321 that is a drive source configured to drive these rollers, a constant direction rotation mechanism 322 configured to rotate the first transport roller 73 in a constant direction regardless of a rotation direction of the drive motor 321, a first drive transmission switching unit 323 configured to switch between a state in which a drive force is transmitted to the first conveying roller 73 and a state in which no drive force is transmitted to the first conveying roller 73, and a second drive transmission switching unit 324 configured to switch between a state in which a drive force is transmitted to the feed roller 72 and the nudger roller 71 and a state in which no drive force is transmitted to the feed roller 72 and the nudger roller 71. In FIG. 3, a broken line indicates a transmission path of a drive force.

As illustrated in FIG. 3, the sheet conveyance device 320 includes a normal conveyance path 325 configured to convey the documents 6 conveyed by the nudger roller 71 such that the documents 6 pass through the feed roller 72, the first conveying roller 73, the conveying rollers 74, 75, and the ejecting roller 77, and a reverse conveyance path 326 configured to reverse front and back sides of the document 6 whose rear end is held by the ejecting roller 77 by reversing a rotation direction of the ejecting roller 77 and to convey the document 6 to the first conveying roller 73 again. The normal conveyance path 325 includes guide members 325a, 325b that are divided into a plurality of parts along the normal conveyance path 325 and are configured to guide the front and back sides of the document 6, the reading guide 78, and the back surface support member 80. The reverse conveyance path 326 includes guide members 326a, 326b configured to guide the front and back sides of the document 6. A switching gate 327 configured to switch a conveyance path of the documents 6 from the normal conveyance path 325 to the reverse conveyance path 326 is provided at a branch position where the normal conveyance path 325 and the reverse conveyance path 326 are separated. The switching gate 327 is formed of an elastically deformable synthetic resin film having a substantially Y-shaped cross section or the like. As illustrated in FIG. 3, normally, a part of the switching gate 327 obliquely crosses the normal conveyance path 325. When the documents 6 are conveyed to the ejecting roller 77 along the normal conveyance path 325, the switching gate 327 is pressed by the documents 6 to elastically deform so as to open the normal conveyance path 325, and switches a conveying direction of the documents 6 to the ejecting roller 77. On the other hand, when a rotation direction of the ejecting roller 77 is reversed while the ejecting roller 77 holds a rear end of the document 6 and the document 6 is conveyed to the first conveying roller 73 along the reverse conveyance path 326, the switching gate 327 switches a conveyance path of the document 6 conveyed by the ejecting roller 77 from the normal conveyance path 325 to the reverse conveyance path 326.

The sheet conveyance device 320 includes a document sensor 328 configured to detect a front end of the document 6 at a position corresponding to the nudger roller 71. A pre-registration sensor 329 configured to detect a front end of the document 6 is provided upstream of the first conveying roller 73 in a conveying direction of the document 6. The sheet conveyance device 320 includes a registration sensor (not illustrated) that is provided downstream of the conveying roller 74 in the conveying direction of the document 6 and is configured to detect a front end of the document 6, and an inverter sensor (not illustrated) that is provided upstream of the ejecting roller 77 in the conveying direction of the document 6 and is configured to detect a rear end of the document 6.

The sheet conveyance device 320 read an image on a back surface of the document 6 by conveying the document 6 to the reverse conveyance path 326. However, images on both front and back surfaces of the document 6 may be read without reversing a conveying direction of the document 6 by providing a second image reading element (not illustrated) configured to read an image on the back surface (the second surface) of the document 6 in a middle of the normal conveyance path 325, instead of providing the reverse conveyance path 326.

In this case, the reverse conveyance path 326 is unnecessary, but it is necessary to newly provide the second image reading element. Therefore, in the image reading device 3, since the second image reading element itself has a certain weight, the duplex automatic document feeder 33 may be further increased in weight.

<Configuration of Main Part of Image Reading Device>

Figure 4:
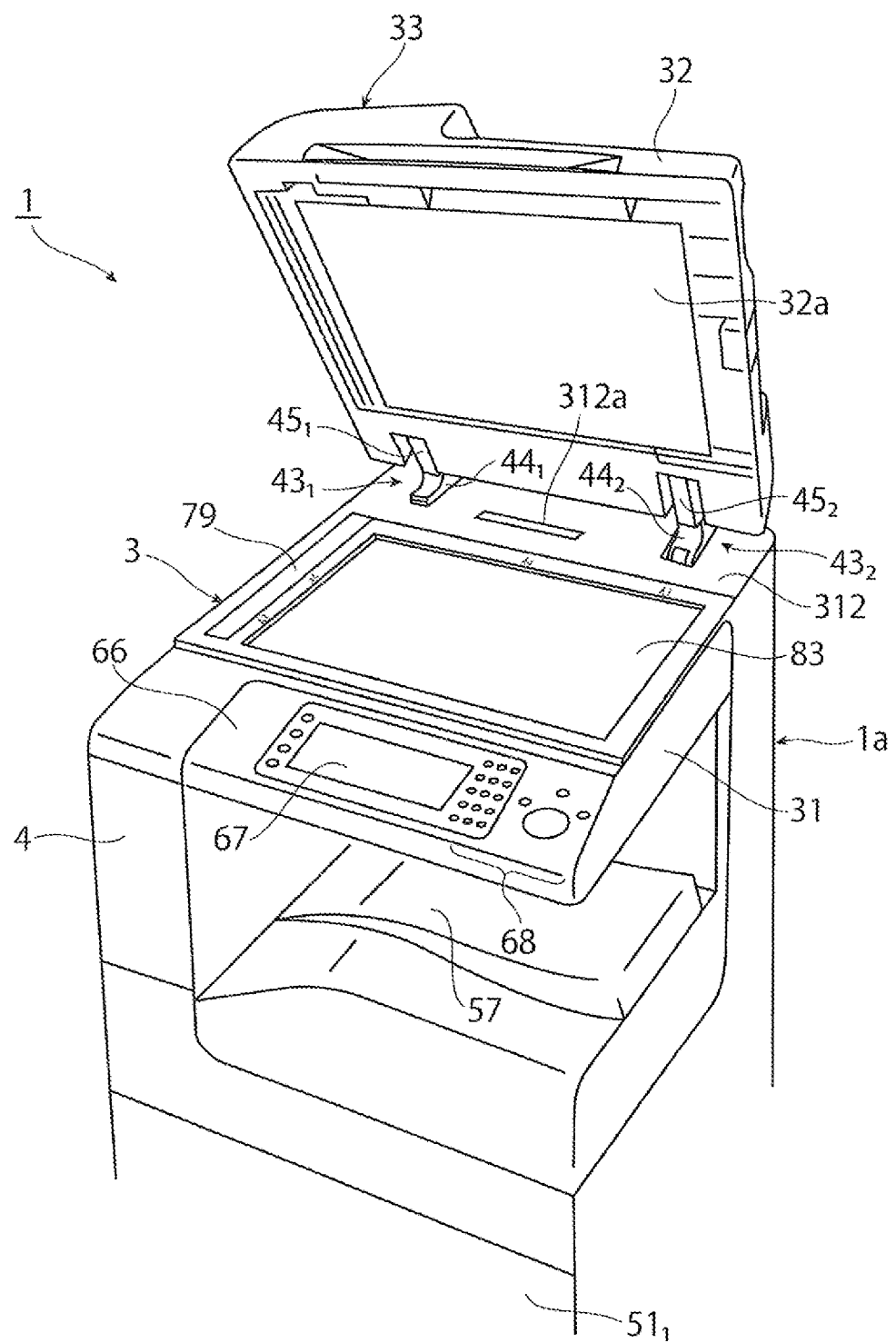
FIG. 4 is a perspective configuration view illustrating a state in which the duplex automatic document feeder of the image forming apparatus according to the first exemplary embodiment of the present invention is opened.

As illustrated in FIG. 4, the image reading device 3 according to the first exemplary embodiment includes the duplex automatic document feeder 33 as an example of a document pressing portion. As described above, the duplex automatic document feeder 33 is provided with the document pressing cover 32. A white sheet-shaped pressing member 32a configured to press a document (not illustrated) placed on the document table 83 is provided on a lower surface of the document pressing cover 32. The pressing member 32a is formed in a planar rectangular shape having substantially the same size as the document table 83. The duplex automatic document feeder 33 separates the documents 6 set in the duplex automatic document feeder 33 and conveys the documents 6 to a reading position one by one. The duplex automatic document feeder 33 includes conveying members configured to convey the documents 6, and the drive motor 321 (see FIG. 3) as a drive source configured to drive the conveying members. The conveying members include the nudger roller 71, the feed roller 72, the first conveying roller 73, the conveying rollers 74, 75, the ejecting roller 77, and the like. Therefore, as described above, the duplex automatic document feeder 33 tends to be heavy (increased in weight) as a whole.

In the second reading mode, when the image reading device 3 places the documents 6 on the document table 83 and reads images of the documents 6, an operator needs to manually open and close the duplex automatic document feeder 33. Therefore, in the image reading device 3, as a weight of the duplex automatic document feeder 33 increases, an operation force required to open and close the duplex automatic document feeder 33 also increases. Therefore, the image reading device 3 is desired to improve operability by reducing the operation force when the duplex automatic document feeder 33 is opened and closed.

As a technique for improving operability in opening and closing the duplex automatic document feeder 33, as described in Patent Literature 1 described above, a technique of detecting an opening and closing angle of the duplex automatic document feeder 33 and controlling an opening and closing speed of the duplex automatic document feeder 33 according to the opening and closing angle of the duplex automatic document feeder 33 has already been proposed.

However, in the image reading device 3, in a case in which an opening and closing angle of the duplex automatic document feeder 33 is detected and an opening and closing speed of the duplex automatic document feeder 33 is controlled according to the opening and closing angle of the duplex automatic document feeder 33, an excessive load is applied to a drive unit configured to open and close the duplex automatic document feeder 33 when, for example, a heavy object such as a book is placed on the duplex automatic document feeder 33 and operation of opening and closing the duplex automatic document feeder 33 is performed. As a result, a gear of the drive unit and the like may be damaged or the operation of opening and closing may malfunction, and operability may be impaired.

Therefore, the image reading device 3 according to the first exemplary embodiment includes the duplex automatic document feeder 33 that is attached to the housing 31 and configured to open or close to the housing 31. The duplex automatic document feeder 33 is configured to convey the documents 6 to a reading position, and an opening force applying unit configured to cause a drive force of the drive motor 34 to act on the duplex automatic document feeder 33 as an opening force (a force in an opening direction) only temporarily when the duplex automatic document feeder 33 is opened.

Here, "temporarily" means that it does not last long only when the duplex automatic document feeder 33 is opened from a state in which the duplex automatic document feeder 33 is completely closed, and does not mean that the opening force is not caused to act after the duplex automatic document feeder 33 has been completely opened. An action of the opening force on the duplex automatic document feeder 33 is limited to, for example, short time in which the duplex automatic document feeder 33 starts to open when the duplex automatic document feeder 33 is opened from a closed state.

Figure 5A:
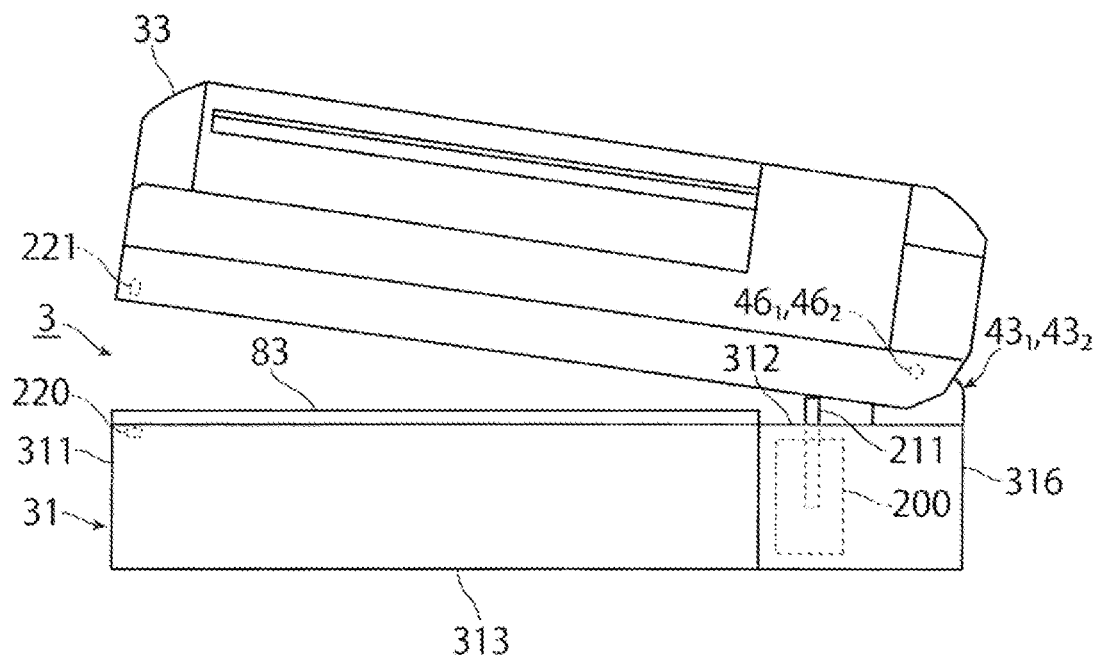
FIG. 5A is a configuration view illustrating the duplex automatic document feeder according to the first exemplary embodiment of the present invention.
Figure 5B:
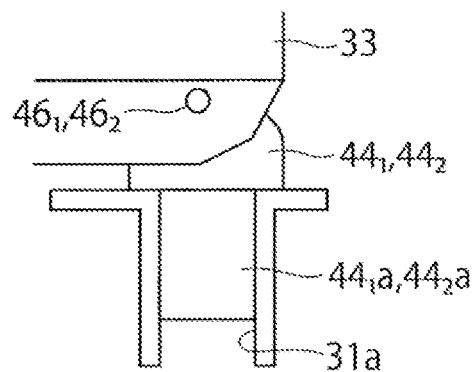
FIG. 5B is a configuration view illustrating the duplex automatic document feeder according to the first exemplary embodiment of the present invention.
Figure 5C:
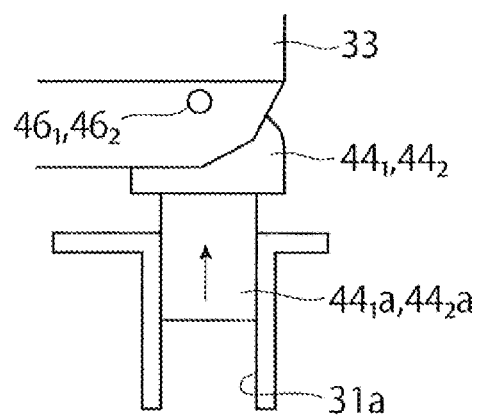
FIG. 5C is a configuration view illustrating the duplex automatic document feeder according to the first exemplary embodiment of the present invention.

That is, in the image reading device 3 according to the first exemplary embodiment, as illustrated in FIG. 4, the duplex automatic document feeder 33 is openably and closably attached to the housing 31 of the image reading device 3 via the first and second shaft support members $43_1$, $43_2$. The first and second shaft support members $43_1$, $43_2$ include bearing portions $44_1$, $44_2$ provided on a housing 31 side of the image reading device 3, and reading rotation portions $45_1$, $45_2$ provided on a duplex automatic document feeder 33 side. As illustrated in FIGS. 5A, 5B, and 5C, the bearing portions $44_1$, $44_2$ and the reading rotation portions $45_1$, $45_2$ are rotatably coupled to each other about rotation shafts $46_1$, $46_2$. In order to reduce a load when the duplex automatic document feeder 33 is opened and closed, each of the reading rotation portions $45_1$, $45_2$ includes a counter balance (not illustrated) configured to cause a rotational moment in an opening direction to act on the duplex automatic document feeder 33. The counter balance includes a coil spring (not illustrated) configured to cause a rotation moment in the opening direction to act on the duplex automatic document feeder 33 according to an opening and closing angle of the duplex automatic document feeder 33. Of course, the counter balance may be provided on a bearing portions $44_1$, $44_2$ side.

The documents 6 from which images are read by the image reading device 3 is not limited to the documents 6 cut into a desired size such as A4 size or A3 size, but also includes a so-called book document having a plurality of pages of the documents 6 such as a book obtained by binding a plurality of pages of the documents 6. In order to read an image of a book document in the image reading device 3, as illustrated in FIG. 4, an image of a page to be read of the book document is caused to face down and is placed on the document table 83 with the duplex automatic document feeder 33 open, and the duplex automatic document feeder 33 is closed.

At this time, since the book document has a certain thickness, when the duplex automatic document feeder 33 is simply openable and closable using the first and second shaft support members $43_1$, $43_2$ as fulcrums, the duplex automatic document feeder 33 is inclined with respect to an upper surface of the book document and cannot press an entire surface of a book document even if the duplex automatic document feeder 33 is closed when the image of the book document is read.

Therefore, as illustrated in FIGS. 5B and 5C, the first and second shaft support members $43_1$, $43_2$ configured to openably and closably support the duplex automatic document feeder 33 are provided with cylindrical elevation portions $44_1a$, $44_2a$ on the bearing portions $44_1$, $44_2$ provided on the housing 31 side of the image reading device 3. The elevation portions $44_1a$, $44_2a$ on the bearing portions $44_1$, $44_2$ are removably inserted into a hole 31a formed in the housing 31. Then, when an image of the document 6 having a certain thickness such as a book document is read, the first and second shaft support members 431, 432 is provided such that the elevation portions 441a, 442a on the bearing portions 441, 442 that are inserted into the hole 31a formed in the housing 31 move upward, and the duplex automatic document feeder 33 is substantially parallel to an upper surface of the book document and may press an entire surface of the book document.

In the duplex automatic document feeder 33, as illustrated in FIG. 4, an end on a left side in the drawing, in which a conveyance portion configured to automatically convey the documents 6 is provided, has a larger weight than that on a right side. As a result, a center of gravity of the duplex automatic document feeder 33 is located at a position biased to the end on the left side in the drawing, in which the conveyance portion configured to automatically convey the documents 6 is provided, rather than a central part in a width direction. Therefore, the counter balance provided in each of the first and second shaft support members $43_1$, $43_2$ is set such that the first counter balance provided on the left side in the drawing has a larger rotational moment applied to the duplex automatic document feeder 33 than the second counter balance provided on the right side. The left side in the drawing is a driving side of the duplex automatic document feeder 33, and the right side is a non-driving side of the duplex automatic document feeder 33.

Figure 6:
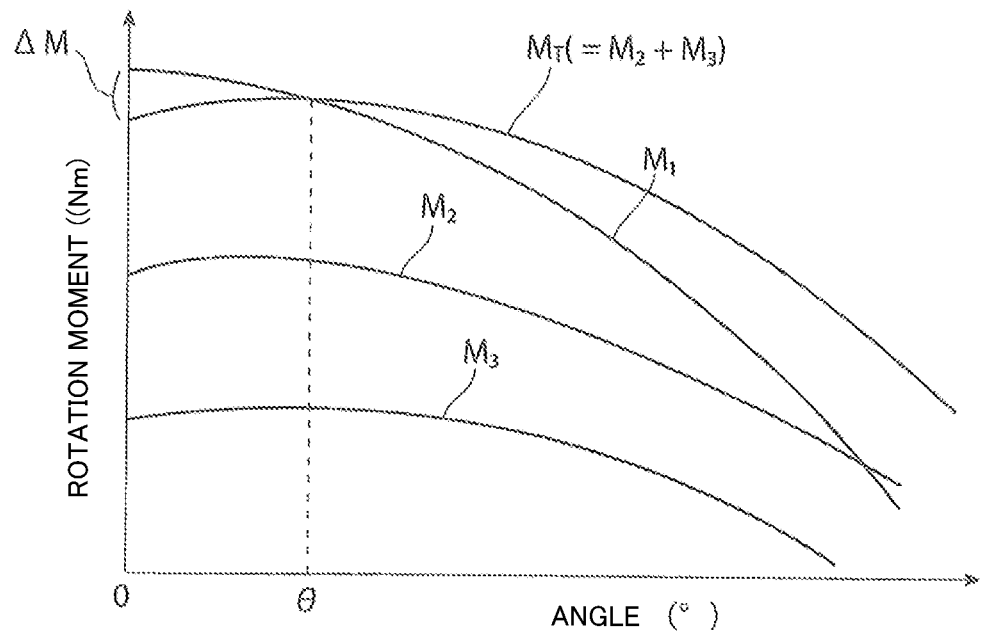
FIG. 6 is a graph showing a rotation moment required to open the duplex automatic document feeder according to the first exemplary embodiment of the present invention.

FIG. 6 is a graph showing a result of obtaining, according to the opening and closing angle of the duplex automatic document feeder 33, each value of a rotation moment $M_1$ required to open the duplex automatic document feeder 33 from a closed state (opening angle=0 degrees), a rotation moment $M_2$ applied to the duplex automatic document feeder 33 by the first shaft support member $43_1$, a rotation moment $M_3$ applied to the duplex automatic document feeder 33 by the second shaft support member $43_2$, and a combined rotation moment MT applied to the duplex automatic document feeder 33 by the first and second shaft support members $43_1$, $43_2$.

In the image reading device 3 according to the first exemplary embodiment, in order to reduce an operation force of an operator as much as possible when the duplex automatic document feeder 33 is opened, the rotation moment $M_1$ required to open the duplex automatic document feeder 33 and the combined rotation moment $M_T$ of the first and second shaft support members $43_1$, $43_2$ are set to be equal when the duplex automatic document feeder 33 is opened at a predetermined angle θ (for example, 10 degrees) of approximately 5 to 25 degrees. A period until the combined rotation moment $M_T$ exceeds the value of the rotation moment $M_1$ is only a temporary example in the exemplary embodiment. When an opening angle of the duplex automatic document feeder 33 exceeds the predetermined angle θ, the combined rotation moment $M_T$ of the first and second shaft support members $43_1$, $43_2$ is set to be larger than the rotation moment $M_1$ required to open the duplex automatic document feeder 33. As a result, an operator may easily open the duplex automatic document feeder 33 in an angle region exceeding the predetermined angle θ even when the weight of the duplex automatic document feeder 33 increases. However, even when an opening angle of the duplex automatic document feeder 33 exceeds the predetermined angle θ, it is desirable that the first and second shaft support members $43_1$, $43_2$ prevent the duplex automatic document feeder 33 from unintentionally opening when an operator stops opening the duplex automatic document feeder 33. Therefore, even when the opening angle of the duplex automatic document feeder 33 exceeds the predetermined angle θ, the first and second shaft support members $43_1$, $43_2$ cause a frictional force to act to maintain an opening angle when an operator releases a hand of the operator from the duplex automatic document feeder 33.

Even when the duplex automatic document feeder 33 is completely closed (opening angle=0 degrees), the combined rotation moment $M_T$ in an opening direction acts by the first and second shaft support members $43_1$, $43_2$. At this time, as shown in FIG. 6, the required combined rotation moment $M_T$ acting on the duplex automatic document feeder 33 by the first and second shaft support members $43_1$, $43_2$ is a value slightly smaller than the rotation moment $M_1$ required to open the duplex automatic document feeder 33 by ΔM.

During a period in which a drive force is applied, a period until the combined rotation moment $M_T$ reliably exceeds a value of the rotation moment $M_1$ is desirable in view of reducing an operation force. In this case, the drive force may be slightly increased in consideration of individual differences of devices. On the other hand, in order to minimize a drive period, an angle may be slightly smaller than the angle θ. However, even in that case, it is better to apply the drive force until ΔM becomes sufficiently small, for example, 10% or less of ΔM when an angle is 0 degree.

If the drive force is continuously applied, a problem may occur. For example, if the duplex automatic document feeder 33 is fully opened and documents are replaced, it will take time to open and close. Therefore, when there is a user who does not fully open the duplex automatic document feeder 33 and only opens the duplex automatic document feeder 33 to some extent, replaces documents in this state, and tries to close the duplex automatic document feeder 33 again, if drive is applied, the duplex automatic document feeder 33 cannot be closed, or an unnecessary load is applied to a drive source, a component that receives drive from the drive source, or the like.

Figure 7A:
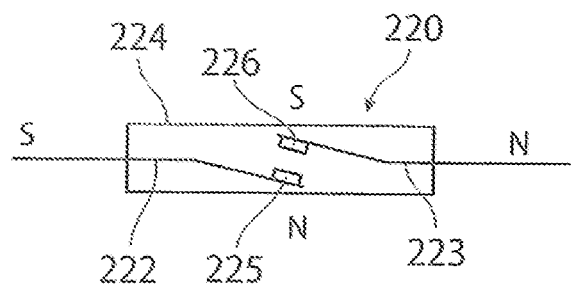
FIG. 7A is a configuration view illustrating a state in which the duplex automatic document feeder according to the first exemplary embodiment of the present invention is closed.
Figure 7B:
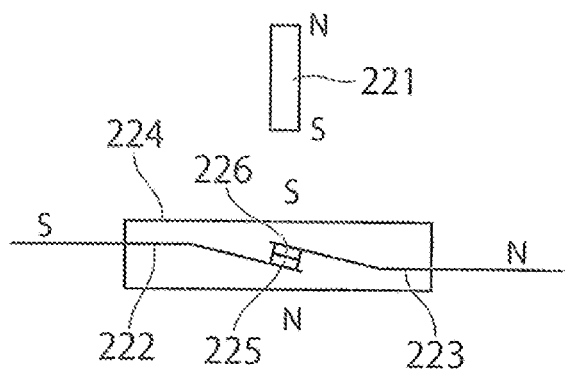
FIG. 7B is a configuration view illustrating a state in which the duplex automatic document feeder according to the first exemplary embodiment of the present invention is closed.

As illustrated in FIG. 5A, the image reading device 3 includes a reed switch 220 and a magnetic member 221 as an example of a detection unit configured to detect opening and closing of the duplex automatic document feeder 33. In the housing 31 of the image reading device 3, for example, the reed switch 220 is provided in front of the reading window 79. As illustrated in FIGS. 7A and 7B, the reed switch 220 includes a first reed 222 formed of a ferromagnetic material in which one end is magnetized to an S pole and the other end is magnetized to an N pole, and a second reed 223 formed of a ferromagnetic material in which one end is magnetized to an N pole and the other end is magnetized to an S pole. The first reed 222 and the second reed 223 are sealed inside a switch body 224. The other end of the first reed 222 and the other end of the second reed 223 are provided with first and second contact portions 225, 226, respectively. The reed switch 220 is attached such that the second reed 223 is located on a front surface side of the housing 31.

On the other hand, a magnetic member 221 is attached to the duplex automatic document feeder 33 at a position corresponding to the reed switch 220 of the housing 31 of the image reading device 3. The magnetic member 221 is an elongated permanent magnet in which both ends are separately magnetized to an S pole and an N pole. The magnetic member 221 is provided such that a magnetic pole of the S pole is located on a lower surface side of the duplex automatic document feeder 33.

Figure 8:
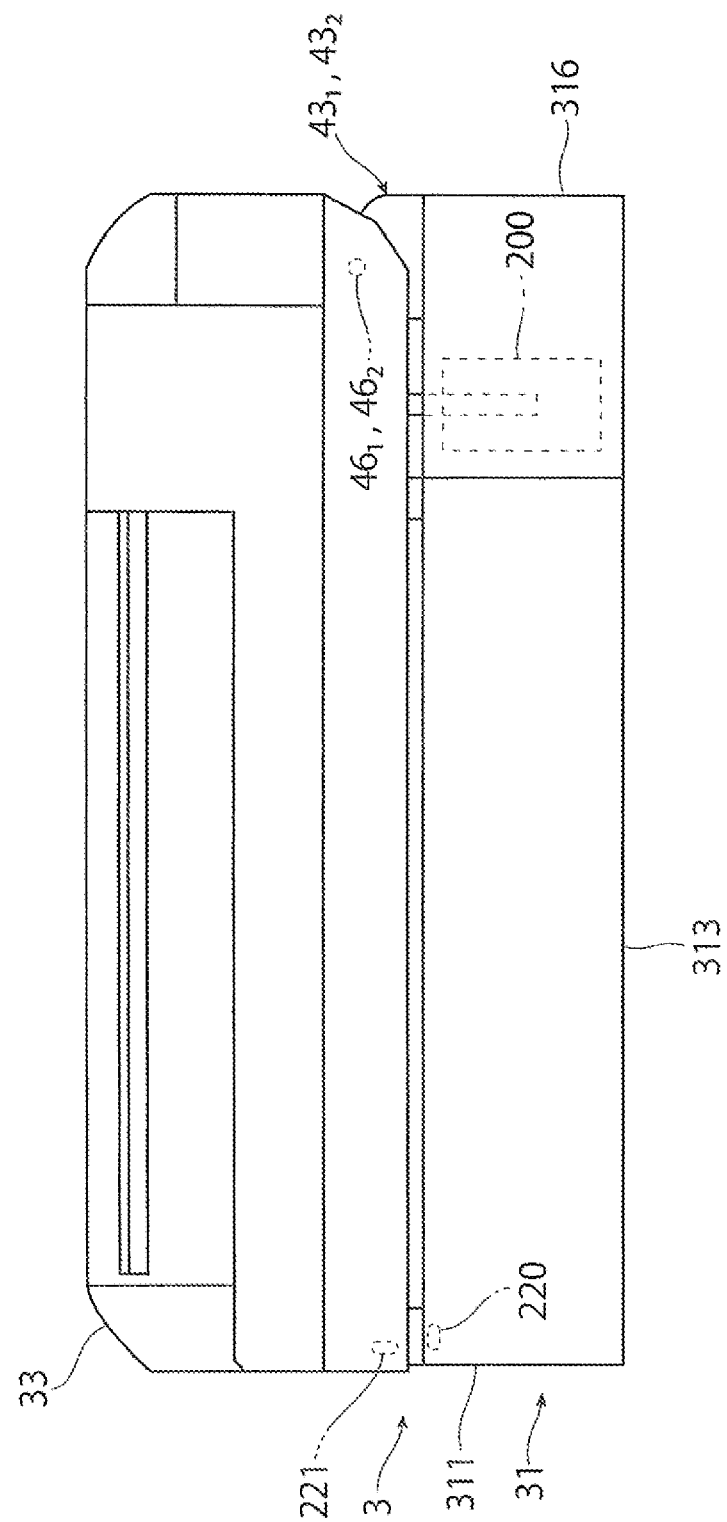
FIG. 8 is a configuration view illustrating a state in which the duplex automatic document feeder according to the first exemplary embodiment of the present invention is closed.

As shown in FIGS. 7B and 8, when the duplex automatic document feeder 33 is closed, the S pole of the magnetic member 221 approaches the second contact portion 226 of the S pole of the second reed 223. A magnetic repulsive force acts on the second contact portion 226 of the S pole of the second reed 223 and a magnetic attraction force acts on the first contact portion 225 of the N pole of the first reed 222, so that the second contact portion 226 of the S pole comes into contact with the first contact portion 225 of the N pole and the reed switch 220 is turned on. On the other hand, as shown in FIGS. 5A and 7A, when the duplex automatic document feeder 33 is opened, the S pole of the magnetic member 221 is separated from the reed switch 220, and an elastic restoring force of the first contact portion 225 including the N pole and the second contact portion 226 including the S pole acts, so that the second contact portion 226 of the second reed 223 is separated from the first contact portion 225 of the first reed 222 and the reed switch 220 is turned off.

In this way, it is possible to detect opening and closing of the duplex automatic document feeder 33 with a simple configuration and with high accuracy by determining whether the reed switch 220 is in an on state or an off state.

A detection unit configured to detect opening and closing of the duplex automatic document feeder 33 is not limited to a combination of the reed switch 220 and the magnetic member 221, and may be a mechanical switch including a contact member that appears and disappears depending on opening and closing of the duplex automatic document feeder 33, an optical switch configured to optically detect opening and closing of the duplex automatic document feeder 33, or the like.

As illustrated in FIG. 5A, in the image reading device 3 according to the first exemplary embodiment, a push-up device 200 configured to push up the duplex automatic document feeder 33 is provided on a back surface of the housing 31 of the image reading device 3 as an example of an opening force applying unit configured to cause a drive force of a drive source to act on the duplex automatic document feeder 33 as an opening force only temporarily when an operator opens the duplex automatic document feeder 33.

In the first exemplary embodiment, as illustrated in FIG. 9, the push-up device 200 does not include a drive source thereof, and uses the drive motor 34 configured to drive a reading optical system of the image reading device 3 as a drive source. Of course, the push-up device 200 may include a drive source thereof.

Figure 10:
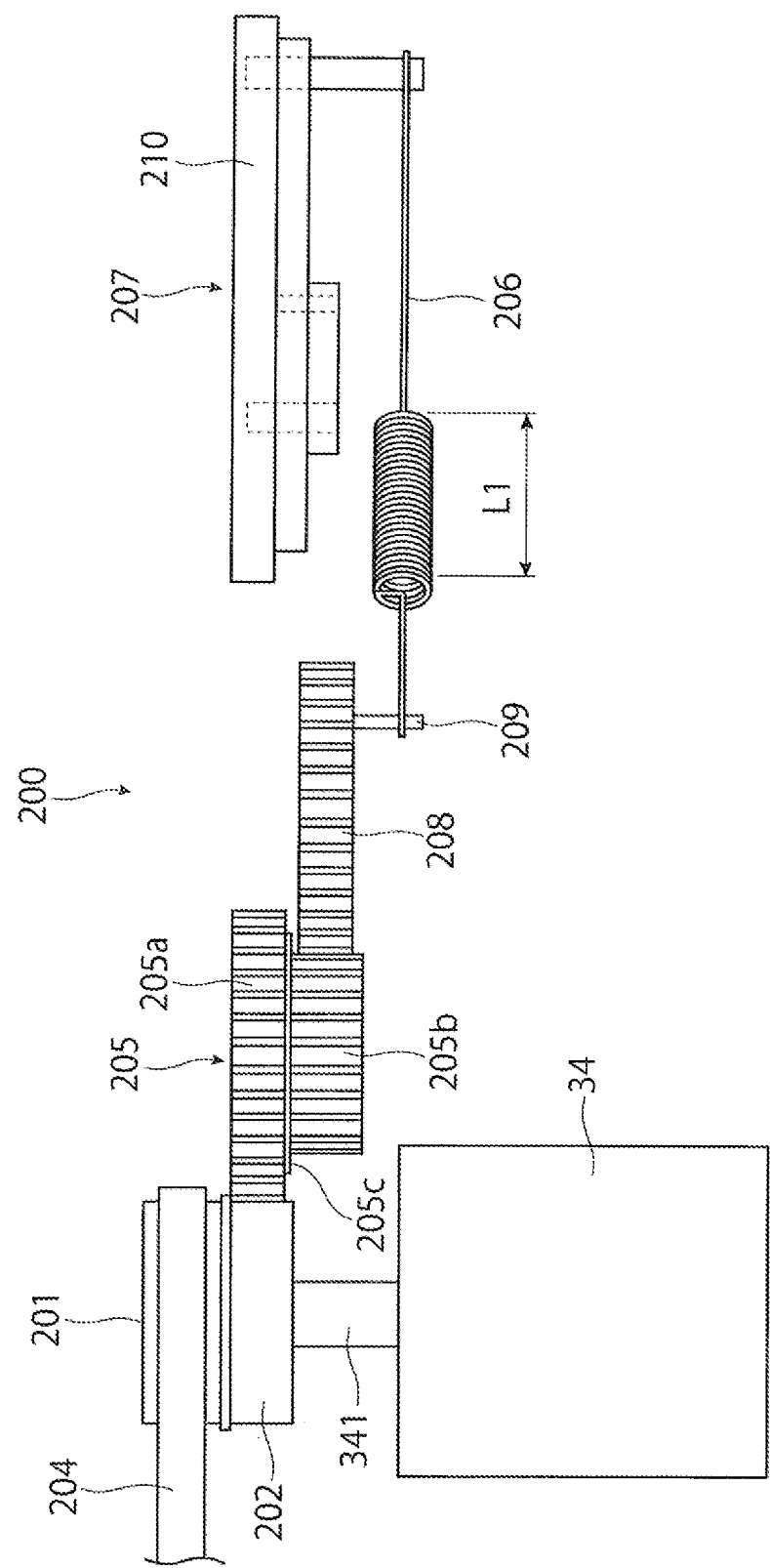
FIG. 10 is a plan configuration view illustrating a push-up device.

As illustrated in FIG. 10, a drive gear 202 configured to drive the push-up device 200 together with a drive pulley 201 configured to drive the reading optical system is attached to a drive shaft 341 of the drive motor 34. As illustrated in FIG. 9, a timing belt 204 is wound around the drive pulley 201 between the drive pulley 201 and a driven pulley 203 configured to drive the reading optical system of the image reading device 3.

As illustrated in FIG. 10, the drive motor 34 is rotationally driven in a normal rotation direction and a reverse rotation direction when images of the documents 6 are read in the second reading mode. The drive gear 202 is meshed with a drive force transmission gear 205 including an electromagnetic clutch 205c as an example of a switching unit configured to switch whether to transmit a rotational drive force of the drive motor 34 to the push-up device 200. The drive force transmission gear 205 includes a first drive force transmission gear 205a having a relatively large outer diameter on an input side and a second drive force transmission gear 205b having a relatively small outer diameter on an output side. The second drive force transmission gear 205b is meshed with a reciprocating gear 208 configured to reciprocate a link mechanism 207 via a drive wire 206, which is an example of a wire member.

An engagement pin 209 is provided on an outer peripheral end of one side surface of the reciprocating gear 208 and protrudes laterally. One end of the drive wire 206 is rotatably engaged with the engagement pin 209. The other end of the drive wire 206 is engaged with the link mechanism 207.

As illustrated in FIG. 9, the link mechanism 207 is attached to a support plate 210 provided upright on a bottom of the housing 31 of the image reading device 3. By moving a lower end of the link mechanism 207 along a horizontal direction, the link mechanism 207 rotates about a rotation fulcrum 215 located in a middle such that an upper end of the link mechanism 207 pushes up a lower surface of the duplex automatic document feeder 33. As illustrated in FIG. 5A, a position, at which the link mechanism 207 pushes up the duplex automatic document feeder 33, is set on a front side of the image reading device 3 with respect to the rotation shafts $46_1$, $46_2$ of the first and second shaft support members $43_1$, $43_2$ and on a rear (back surface) side with respect to the document table 83 which is a reading position of the documents 6. As the position, at which the link mechanism 207 pushes up the duplex automatic document feeder 33, is farther from the rotation shafts $46_1$, $46_2$ of the first and second shaft support members $43_1$, $43_2$, a distance between the rotation shafts $46_1$, $46_2$ and an action point at which a push-up force acts on the duplex automatic document feeder 33 becomes longer, and the rotation moment M acting on the duplex automatic document feeder 33 becomes larger.

However, as shown in FIG. 6, the rotation moment M to be applied to the duplex automatic document feeder 33 by the link mechanism 207 pushing up the duplex automatic document feeder 33 may be equal to or larger than the difference ΔM between the rotation moment $M_1$ required to open the duplex automatic document feeder 33 and the combined rotation moment $M_T$ to be applied to the duplex automatic document feeder 33 by a counter balance between the first and second shaft support members $43_1$, $43_2$. Therefore, the link mechanism 207 does not need to apply a large rotation moment M to the duplex automatic document feeder 33. The link mechanism 207 may be provided close to the rotation shafts $46_1$, $46_2$ of the first and second shaft support members $43_1$, $43_2$. Therefore, the link mechanism 207 may be provided close to a back surface of the housing 31 of the image reading device 3, and the housing 31 of the image reading device 3 may be prevented from increasing in size.

As shown in FIG. 9, the link mechanism 207 includes a first link member 211 whose upper end 211a is in contact with the lower surface of the duplex automatic document feeder 33 in a closed state and whose lower end 211b is movably supported along the horizontal direction, and a second link member 212 whose upper end 212a is rotatably connected to a middle of the first link member 211 and whose lower end 212b is movably supported along the horizontal direction.

As shown in FIGS. 9 and 10, the first link member 211 is formed in an elongated flat plate shape. The lower end 211b of the first link member 211 is attached to a first guide groove 213 formed in the support plate 210 so as to be movable along the horizontal direction in a state along a surface of the support plate 210 via a first sliding shaft 214. The support plate 210 is formed with the first guide groove 213 along the horizontal direction for a required length. The upper end 211a of the first link member 211 is stopped at a position abutting against a lower end surface of the duplex automatic document feeder 33. A front end of the drive wire 206 is rotatably connected to the lower end 211b of the first link member 211 via the first sliding shaft 214.

On the other hand, the second link member 212 is formed in an elongated flat plate shape having a shorter length than the first link member 211. The upper end 212a of the second link member 212 is rotatably connected to the rotation fulcrum 215 located in a middle of the first link member 211 in the longitudinal direction of the first link member 211. A connection position of the second link member 212 is the rotation fulcrum 215 when the first link member 211 rotates in an upright direction. At a position below the lower end 211b of the first link member 211, the lower end 212b of the second link member 212 is attached to a second guide groove 216 formed in the support plate 210 so as to be movable along the horizontal direction in a state along the surface of the support plate 210 via a second sliding shaft 217. The support plate 210 is formed with the second guide groove 213, which is configured to guide the lower end 212b of the second link member 212, along the horizontal direction for a required length.

Figure 11:
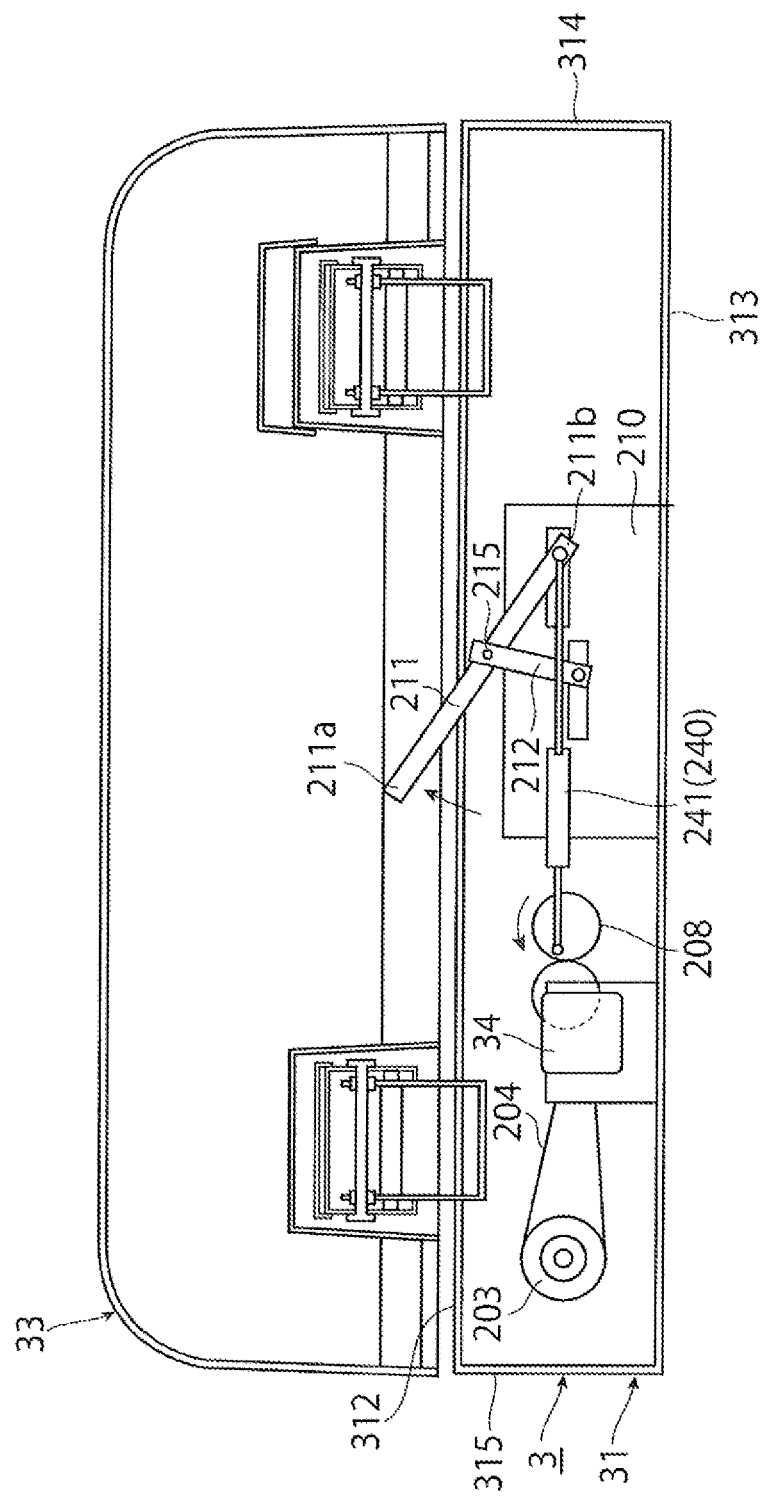
FIG. 11 is a configuration view illustrating a main part of the duplex automatic document feeder according to the first exemplary embodiment of the present invention.
Figure 12:
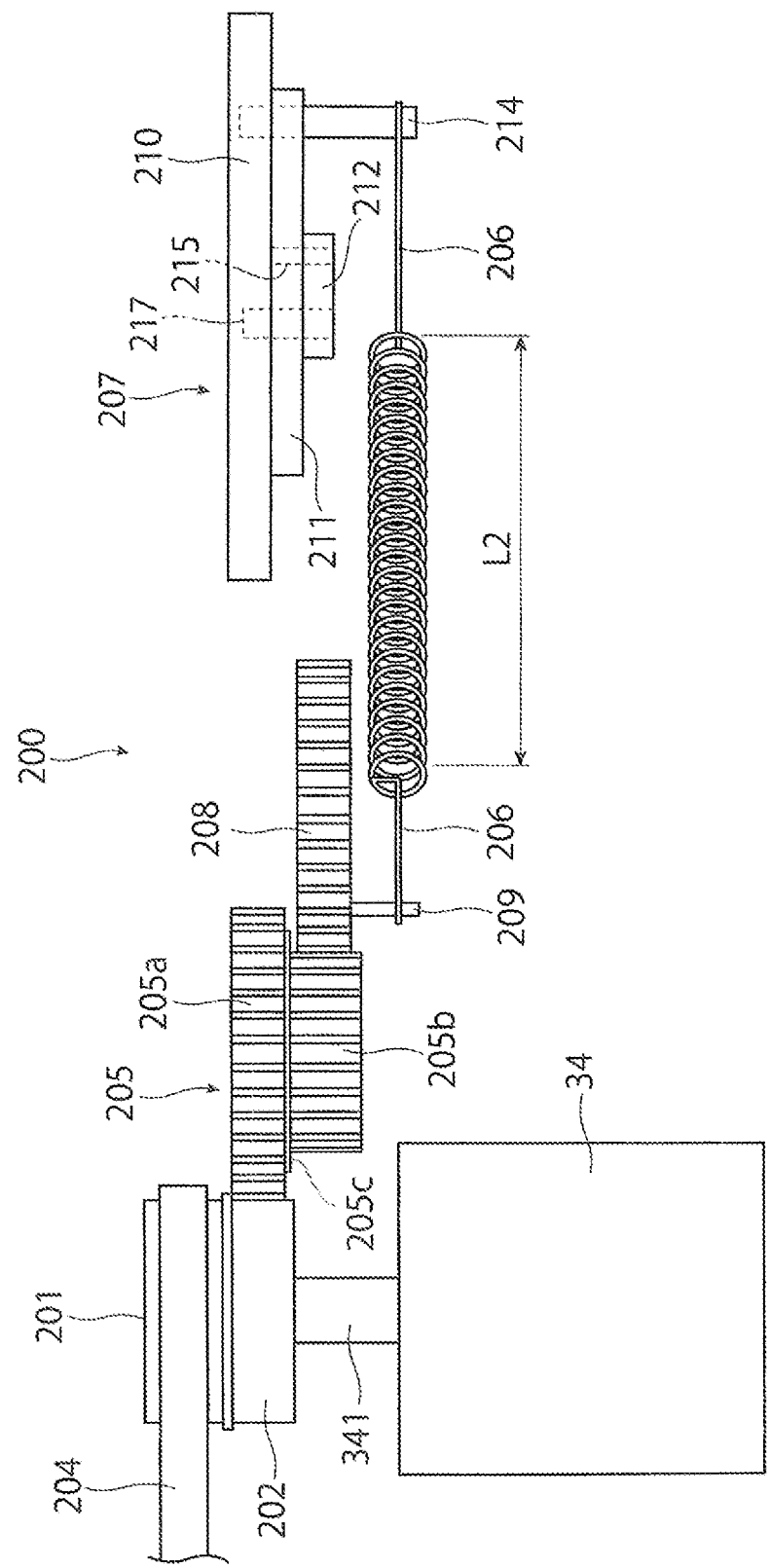
FIG. 12 is a plan configuration view illustrating the push-up device.

In the link mechanism 207, as illustrated in FIGS. 11 and 12, by rotationally driving the drive motor 34 in a required direction, the reciprocating gear 208 rotates counterclockwise in the drawing, and the drive wire 206 connected to the engagement pin 209 of the reciprocating gear 208 moves leftward in the drawing. Then, the drive wire 206 is pulled leftward in the drawing as the reciprocating gear 208 rotates, and moves the lower end 211b of the first link member 211 leftward along the horizontal direction.

The second link member 212 is rotatably connected to the middle of the first link member 211 with the rotation fulcrum 215 as a fulcrum. Therefore, as illustrated in FIG. 11, the upper end 211a of the first link member 211 rotates in a clockwise direction in FIG. 11 with the rotation fulcrum 215 as a fulcrum. In the second link member 212, the rotation fulcrum 215, which is a connection position with the first link member 211, moves upward as the first link member 211 rotates in the clockwise direction. Therefore, the upper end 212a of the second link member 212 moves rightward in the drawing as the first link member 211 rotates in the clockwise direction, and the lower end 212b of the second link member 212 also moves rightward in the drawing.

Then, the first link member 211 rotates in the clockwise direction in the drawing with the rotation fulcrum 215 with the second link member 212 as a fulcrum due to a tension of the drive wire 206 acting on the lower end 211b of the first link member 211. At the same time, the upper end 211a of the first link member 211 protrudes upward from an upper end surface of the housing 31 of the image reading device 3 to push up the duplex automatic document feeder 33 and assist an operator in opening the duplex automatic document feeder 33.

As illustrated in FIG. 4, the upper wall 312 of the housing 31 of the image reading device 3 is formed with a slit-shaped opening 312a in which the first link member 211 appears and disappears.

When an operator opens the duplex automatic document feeder 33, the drive motor 34 is only temporarily driven for a predetermined time T and pushes up the duplex automatic document feeder 33 via the link mechanism 207. After opening the duplex automatic document feeder 33 by a set angle larger than the predetermined angle θ by several degrees (1 to 2 degrees), the drive motor 34 is stopped and is immediately and rotationally rotated in a reverse direction to complete push-up operation of the duplex automatic document feeder 33.

Here, the predetermined time T for rotationally driving the drive motor 34, that is, the constant time T has the same meaning as the above-described "temporarily". The constant time T means that it does not last long only when the duplex automatic document feeder 33 is opened from a state in which the duplex automatic document feeder 33 is completely closed, and does not mean that the opening force is not caused to act after the duplex automatic document feeder 33 has been completely opened.

At the predetermined angle θ, for example, the rotation moment $M_1$ required to open the duplex automatic document feeder 33 is equal to the combined rotation moment $M_T$ of the first and second shaft support members $43_1$, $43_2$.

The drive wire 206 may not rotatably be connected to the reciprocating gear 208 via the engagement pin 209, but may include a take-up reel (not illustrated) instead of the reciprocating gear 208. One end of the drive wire 206 may be fixed to the take-up reel, and the drive wire 206 may be taken up by the take-up reel.

When the image reading device 3 according to the first exemplary embodiment is in a state in which a heavy object such as a book is placed on the duplex automatic document feeder 33 when the duplex automatic document feeder 33 is closed, the duplex automatic document feeder 33 may not be opened even if the link mechanism 207 is driven, and an excessive load may be applied to the drive motor 34 configured to drive the link mechanism 207.

In the image reading device 3 according to the first exemplary embodiment, after an operator has once opened the duplex automatic document feeder 33, the operator may close the duplex automatic document feeder 33 before the duplex automatic document feeder 33 opens by the predetermined angle θ. Then, in the image reading device 3, the duplex automatic document feeder 33 may be forcibly closed while the link mechanism 207 is driven to open the duplex automatic document feeder 33 by the predetermined angle θ, and an excessive load may be applied to the drive motor 34 configured to drive the link mechanism 207.

Therefore, the image reading device 3 according to the first exemplary embodiment includes an absorption portion 240 configured to absorb an excessive force exceeding a predetermined value when the excessive force acts on the push-up device 200. The absorption portion 240 is an example of an elastic member configured to absorb an excessive force by elastically deforming when the excessive force acts on the push-up device 200.

Figure 14:
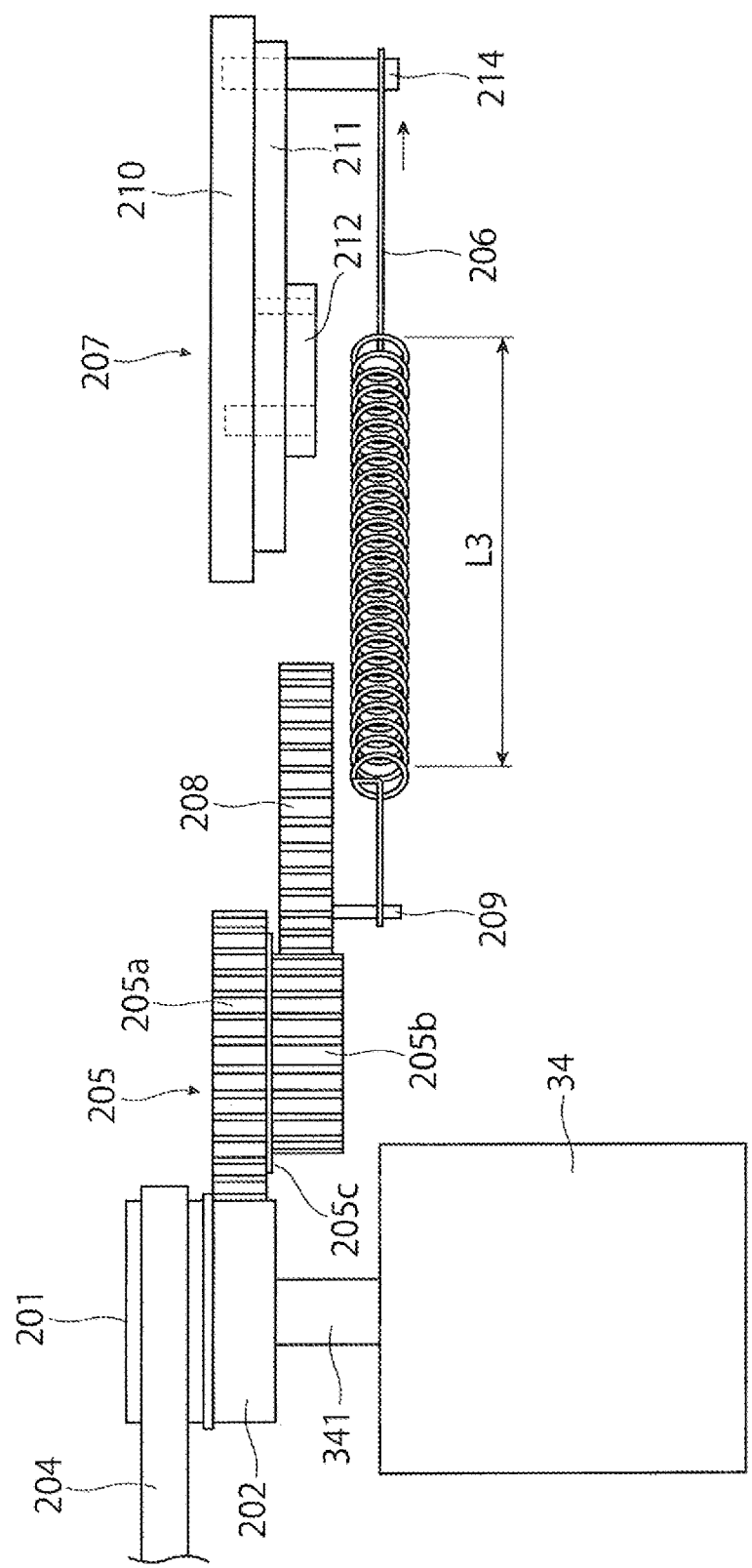
FIG. 14 is a configuration view illustrating a main part of the duplex automatic document feeder according to the first exemplary embodiment of the present invention.

More specifically, in the image reading device 3, a coil spring 241, which is an example of the absorption portion 240, is interposed in a middle of the drive wire 206 configured to transmit a drive force of the drive motor 34 to the link mechanism 207. The coil spring 241 has a required spring constant. The spring constant of the coil spring 241 is set to a value that is larger than a tension acting on the drive wire 206 when the link mechanism 207 pushes up the duplex automatic document feeder 33 and that is smaller than a tension when a load exceeding a predetermined value acts on the push-up device 200 as in a case in which a heavy object is placed on the duplex automatic document feeder 33. Therefore, the coil spring 241 extends to a certain length L2 when the link mechanism 207 pushes up the duplex automatic document feeder 33. However, as illustrated in FIG. 14, the length L2 of the coil spring 241 is shorter than a length L3 when a load exceeding a predetermined value acts on the push-up device 200. The coil spring 241 has a length L1 in a state before a tension acts on the drive wire 206.

In the first exemplary embodiment, when an excessive load is applied to the drive motor 34, the coil spring 241 is extended to absorb the excessive load acting on the drive motor 34. Therefore, the drive motor 34 is prevented from generating heat due to an overload and being disconnected, or teeth of the reciprocating gear 208 configured to transmit a drive force is prevented from being chipped or out of step.

Figure 13:
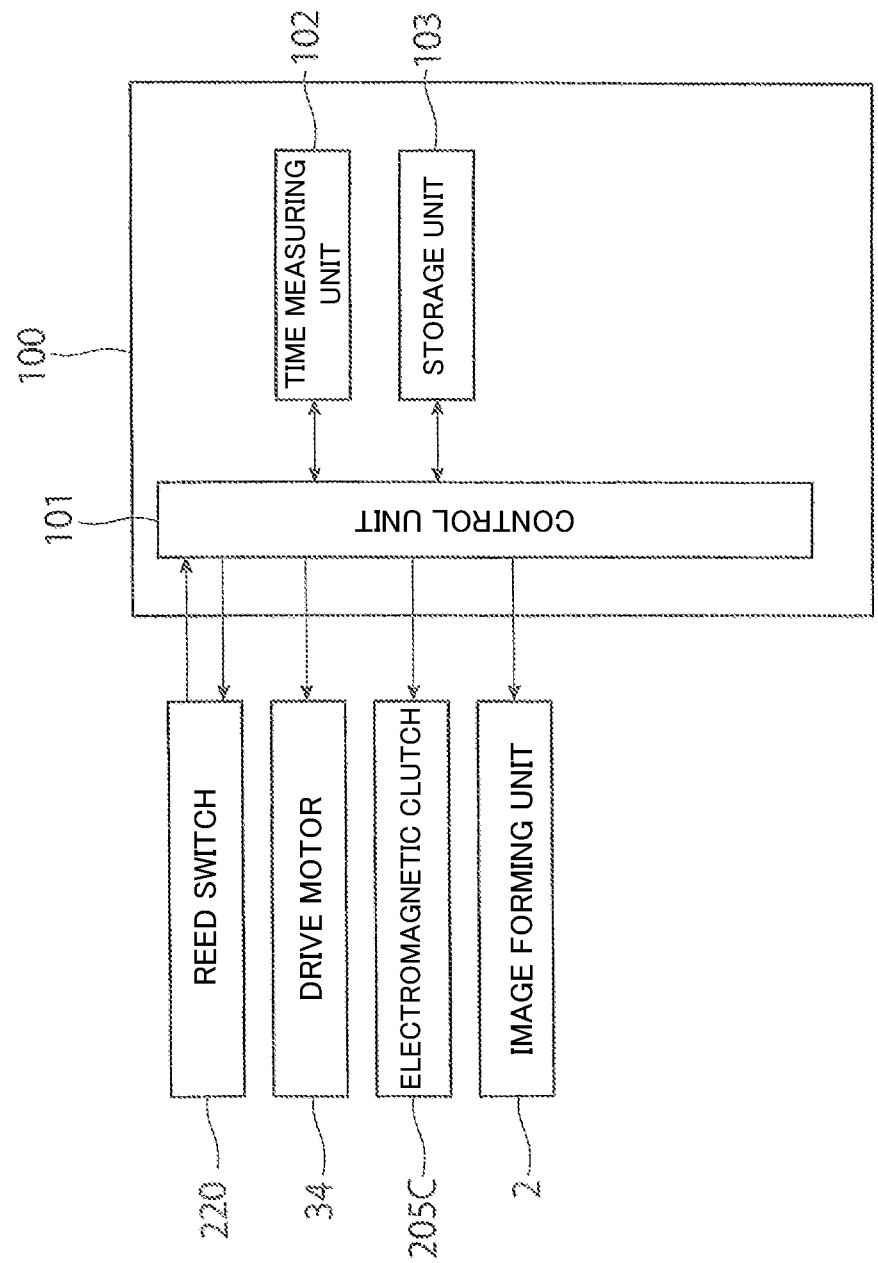
FIG. 13 is a block diagram showing a control device.

FIG. 13 is a block diagram showing the control device 100 of the image forming apparatus 1 according to the first exemplary embodiment.

As shown in FIG. 13, the control device 100 includes a control unit 101 as an example of a control unit, a time measuring unit 102 configured to measure time, and a storage unit 103 as an example of a storage unit.

The control unit 101 is configured to integrally control operation of the image forming apparatus 1 including image reading operation performed by the image reading device 3 by executing a program stored in the storage unit 103. In each of the image forming devices 10Y, 10M, 10C, and 10K for yellow (Y), magenta (M), cyan (C), and black (K), the control unit 101 drives an image forming unit 2 including a charging device, an exposure device, a developing device, and a primary transfer device, and the like (not shown) to perform forming operation of a color image or the like.

The control unit 101 controls reading operation of the image reading device 3 via the time measuring unit 102, the storage unit 103, and the like.

At this time, when it is detected that the duplex automatic document feeder 33 has shifted from a closed state to an opened state based on an open and close signal of the duplex automatic document feeder 33 input from the reed switch 220, the control unit 101 drives the drive motor 34 for the predetermined time T (only temporarily). Here, the predetermined time T is set to, for example, time required for the drive motor 34 to open the duplex automatic document feeder 33 by a set angle larger than the predetermined angle θ by several degrees (1 to 2 degrees).

At the same time, when it is detected that the duplex automatic document feeder 33 has shifted from a closed state to an opened state based on an open and close signal of the duplex automatic document feeder 33 input from the reed switch 220, the time measuring unit 102 measures elapsed time. Then, when measuring that the predetermined time T has elapsed, the time measuring unit 102 outputs a signal indicating that the predetermined time T has elapsed to the control unit 101.

Upon receiving the signal indicating that the predetermined time T has elapsed, which is output from the time measuring unit 102, the control unit 101 stops the drive motor 34, and then performs control to rotationally drive the drive motor 34 in a reverse direction by the predetermined time T and stop the drive motor 34.

The control unit 101 turns on and off the electromagnetic clutch 205c at a required timing. A timing at which the control unit 101 turns on the electromagnetic clutch 205c is set to a timing at which it is detected that the duplex automatic document feeder 33 has opened based on an open and close signal of the duplex automatic document feeder 33 input from the reed switch 220. A timing at which the control unit 101 turns off the electromagnetic clutch 205c is set to a timing at which the predetermined time T has elapsed since the electromagnetic clutch 205c is turned on.

<Operation of Image Reading Device>

In the image forming apparatus 1, to which the image reading device 3 according to the first exemplary embodiment is applied, as described below, when images of the documents 6 are copied or the images of the documents 6 are read and transmitted using a facsimile function or the like, it is possible to reduce an operation force when the duplex automatic document feeder 33 in the image reading device 3 is opened without impairing operability as compared with a case in which the duplex automatic document feeder 33 is driven to open and close over all opening and closing angles.

That is, in the image reading device 3 of the image forming apparatus 1, as illustrated in FIG. 4, when images of the documents 6 are read in the second reading mode, the duplex automatic document feeder 33 functioning as a document pressing portion is opened, the documents 6 are placed on the document table (the platen glass) 83 provided on the upper end surface of the housing 31 of the image reading device 3, and desired copy operation or the like is performed by the control panel 66 of the image forming apparatus 1 after the duplex automatic document feeder 33 has been closed.

According to operation designated by the control panel 66, the image reading device 3 reads images of the documents 6 by the image reading device 3, forms the images of the documents 6 on the recording sheets 5 by the image forming unit 2 of the image forming apparatus 1, transmits the images of the documents 6 read by the image reading device 3 to a personal computer (not illustrated), or transmits the images of the documents 6 read by the image reading device 3 using a facsimile function.

In the image reading device 3 configured to read images of the documents 6, the duplex automatic document feeder 33 includes a conveyance member configured to automatically convey the documents 6 in the first reading mode, the drive motor 321, and the like, so that the image reading device 3 has a relatively large weight. Therefore, in the image reading device 3, when the documents 6 are pressed by the duplex automatic document feeder 33 and images of the documents 6 are read while the documents 6 are placed on the document table 83, it is necessary for an operator to open and close the duplex automatic document feeder 33 having a relatively large weight.

When an operator opens the duplex automatic document feeder 33, the image reading device 3 detects, by the reed switch 220, that the duplex automatic document feeder 33 is opened.

As shown in FIG. 13, when it is detected that the duplex automatic document feeder 33 is opened since a signal from the reed switch 220 shifts from an on state to an off state, the control unit 101 of the control device 100 turns on the electromagnetic clutch 205c of the drive force transmission gear 205, and at the same time, rotationally drives the drive motor 34 for the predetermined time T (only temporarily).

In the image reading device 3, as illustrated in FIG. 9, when the drive motor 34 is rotationally driven, the drive force transmission gear 205 is rotationally driven by the drive motor 34. In the drive force transmission gear 205, since the electromagnetic clutch 205c is in an on state, a rotational drive force from the drive motor 34 is transmitted to the second drive force transmission gear 205b, and the reciprocating gear 208 is rotationally driven by a required angle in the counterclockwise direction in the drawing.

Then, a tension to a left in the drawing acts on the drive wire 206 whose one end is connected to the reciprocating gear 208, and the lower end 211b of the first link member 211 of the link mechanism 207 is moved leftward in the drawing via the coil spring 241.

As illustrated in FIG. 11, when the lower end 211b of the first link member 211 moves leftward in the drawing, the upper end 211a rotates in the clockwise direction around the rotation fulcrum 215 located in a middle, and the lower surface of the duplex automatic document feeder 33 is pushed upward to open the duplex automatic document feeder 33.

Therefore, when an operator opens the duplex automatic document feeder 33, since operation of opening the duplet automatic document feeder 33 is assisted by push-up operation of the first link member 211, it is possible to easily open the duplex automatic document feeder 33 regardless of a weight of the duplex automatic document feeder 33.

As shown in FIG. 6, an angle at which the first link member 211 opens the duplex automatic document feeder 33 is set to a set angle larger than the predetermined angle θ by several degrees (1 to 2 degrees). Therefore, after the operation of opening the duplex automatic document feeder 33 has been assisted by the first link member 211, an operator may easily open the duplex automatic document feeder 33 to a fully open position with the combined rotation moment $M_T$ acting by the counter balance provided in the first and second shaft support members $43_1$, $43_2$.

When the time measuring unit 102 measures that the predetermined time T has elapsed, the control unit 101 of the control device 100 stops the drive motor 34 and then rotationally drives the drive motor 34 in a reverse direction by the predetermined time T immediately. The control unit 101 stops the drive motor 34, and at the same time, turns off the electromagnetic clutch 205c.

Then, as illustrated in FIG. 9, as the drive motor 34 rotates in a reverse direction, the drive wire 206 whose one end is connected to the reciprocating gear 208 moves rightward in the drawing to move the lower end 211b of the first link member 211 of the link mechanism 207 rightward in the drawing.

When the lower end 211b of the first link member 211 moves rightward in the drawing, the upper end 211a rotates in the counterclockwise direction around the rotation fulcrum 215 located in the middle and moves downward, and is separated from the lower surface of the duplex automatic document feeder 33.

In the first exemplary embodiment, since the electromagnetic clutch 205c is turned off, the second drive force transmission gear 205b of the drive force transmission gear 205 is freely rotatable, and operation of pulling the drive wire 206 is released.

As described above, in the image reading device 3 according to the first exemplary embodiment, an operator detects the operation of opening the duplex automatic document feeder 33 by the reed switch 220 and drives the drive motor 34, so that the duplex automatic document feeder 33 is temporarily pushed up by the drive wire 206 and the link mechanism 207. Therefore, even when the duplex automatic document feeder 33 has a relatively large weight, operation of opening the duplex automatic document feeder 33 performed by an operator is assisted by the drive motor 34, and the operation of opening the duplex automatic document feeder 33 may be easily performed.

In the image reading device 3 according to the first exemplary embodiment, when a heavy object such as a book (not illustrated) is placed on the duplex automatic document feeder 33, or when an operator performs closing operation of the duplex automatic document feeder 33 during the opening operation of the duplex automatic document feeder 33, as illustrated in FIG. 14, since the coil spring 241 is interposed in the middle of the drive wire 206, the coil spring 241 expands by the length L3 to absorb an excessive load, and the excessive load is prevented from acting on the drive motor 34.

Therefore, according to the image reading device 3 according to the first exemplary embodiment, it is possible to reduce an operation force when the duplex automatic document feeder 33 is opened without impairing operability as compared with the case in which the duplex automatic document feeder 33 is driven to open and close over all opening and closing angles.

Second Exemplary Embodiment

Figure 15:
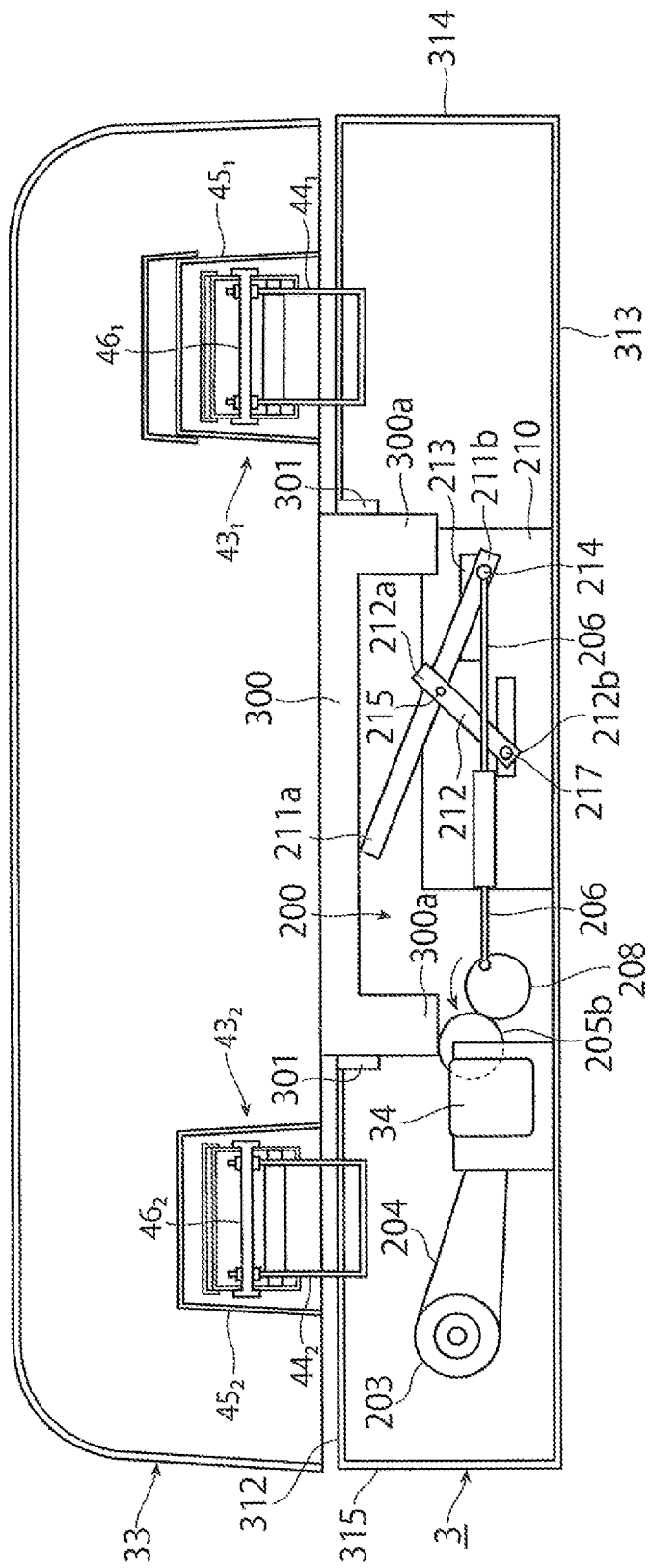
FIG. 15 is a configuration view illustrating a main part of an image reading device according to a second exemplary embodiment of the present invention.
Figure 16:
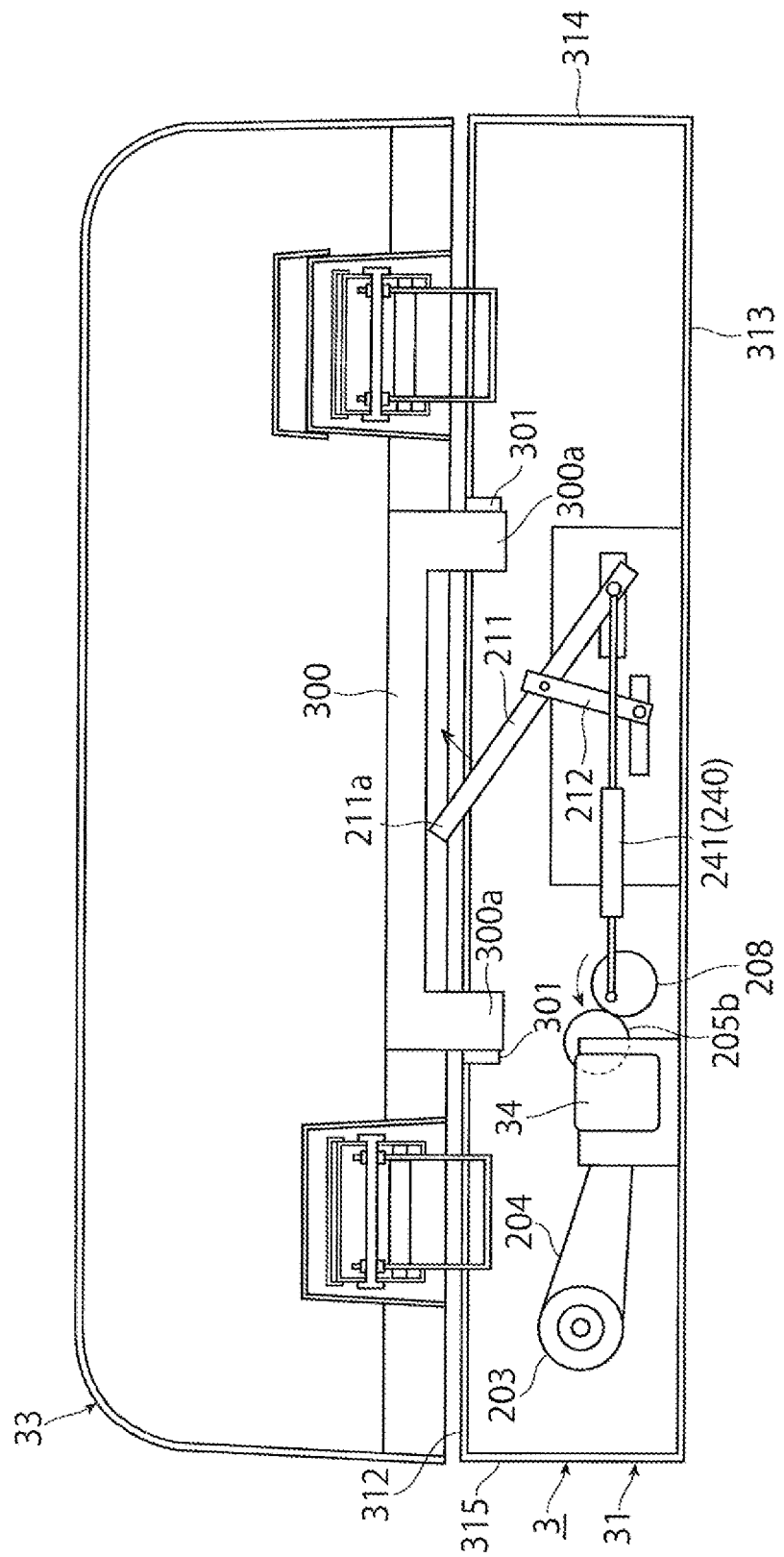
FIG. 16 is a configuration view illustrating a main part of the image reading device according to the second exemplary embodiment of the present invention.

FIGS. 15 and 16 are configuration views illustrating an image reading device according to the second exemplary embodiment of the present invention.

As illustrated in FIG. 15, the image reading device 3 according to the second exemplary embodiment is provided on a back side of the housing 31 of the image reading device 3 instead of directly pushing up the duplex automatic document feeder 33 by the link mechanism 207, and is provided to push up the duplex automatic document feeder 33 via a flat plate-shaped fall prevention member 300 configured to prevent the documents 6 from falling from the upper wall 312 of the housing 31 to the back side.

The housing 31 of the image reading device 3 is provided with a guide member 301 configured to guide the fall prevention member 300 such that the fall prevention member 300 may move up and down along an upper-lower direction (a vertical direction). The fall prevention member 300 includes a guide portion 300a that is guided in the upper-lower direction by the guide member 301 at both ends along a width direction of the fall prevention member 300. The guide member 301 supports the fall prevention member 300 with a certain degree of friction force, and may hold a raised position when the fall prevention member 300 moves upward.

Similarly to the first exemplary embodiment, a lower end of the fall prevention member 300 abuts against the upper end 211a of the first link member 211 of the link mechanism 207. The link mechanism 207 is driven by the drive motor 34.

In the second exemplary embodiment, as illustrated in FIG. 16, when an operator opens the duplex automatic document feeder 33, the drive motor 34 is rotationally driven to move the fall prevention member 300 upward via the link mechanism 207, and the duplex automatic document feeder 33 is pushed up and opened by the fall prevention member 300.

In this way, since the duplex automatic document feeder 33 is pushed up on an upper end surface of the fall prevention member 300, a push-up force may be uniformly applied to the duplex automatic document feeder 33 and push-up operation may be smoothly performed as compared with the case in which the duplex automatic document feeder 33 is pushed up by the upper end 211a of the first link member 211 of the link mechanism 207.

Thereafter, the drive motor 34 is rotationally driven in a reverse direction after being stopped, and the link mechanism 207 moves down. However, the fall prevention member 300 maintains a position raised by a frictional force of the guide member 301. Therefore, in the image reading device 3 according to the second exemplary embodiment, even when the duplex automatic document feeder 33 is opened, the documents 6 are prevented from falling from between the first and second shaft support members $43_1$, $43_2$ to a back side. The raised fall prevention member 300 is pushed down by the duplex automatic document feeder 33 when the duplex automatic document feeder 33 is closed.

Other configurations and operations are the same as those of the first exemplary embodiment, so a description thereof will be omitted.

In the above-described exemplary embodiment, the image reading device is applied to a color copying machine as an example of an image forming apparatus. However, the present invention is not limited thereto, and the image reading device may be used as a scanner, a fax machine, or the like.

In the above-described exemplary embodiment, the coil spring is used as an absorption portion. However, as the absorption portion, a torque limiter configured to limit driving torque may be provided on the drive force transmission gear 205 or the like.

Third Exemplary Embodiment

Figure 17:
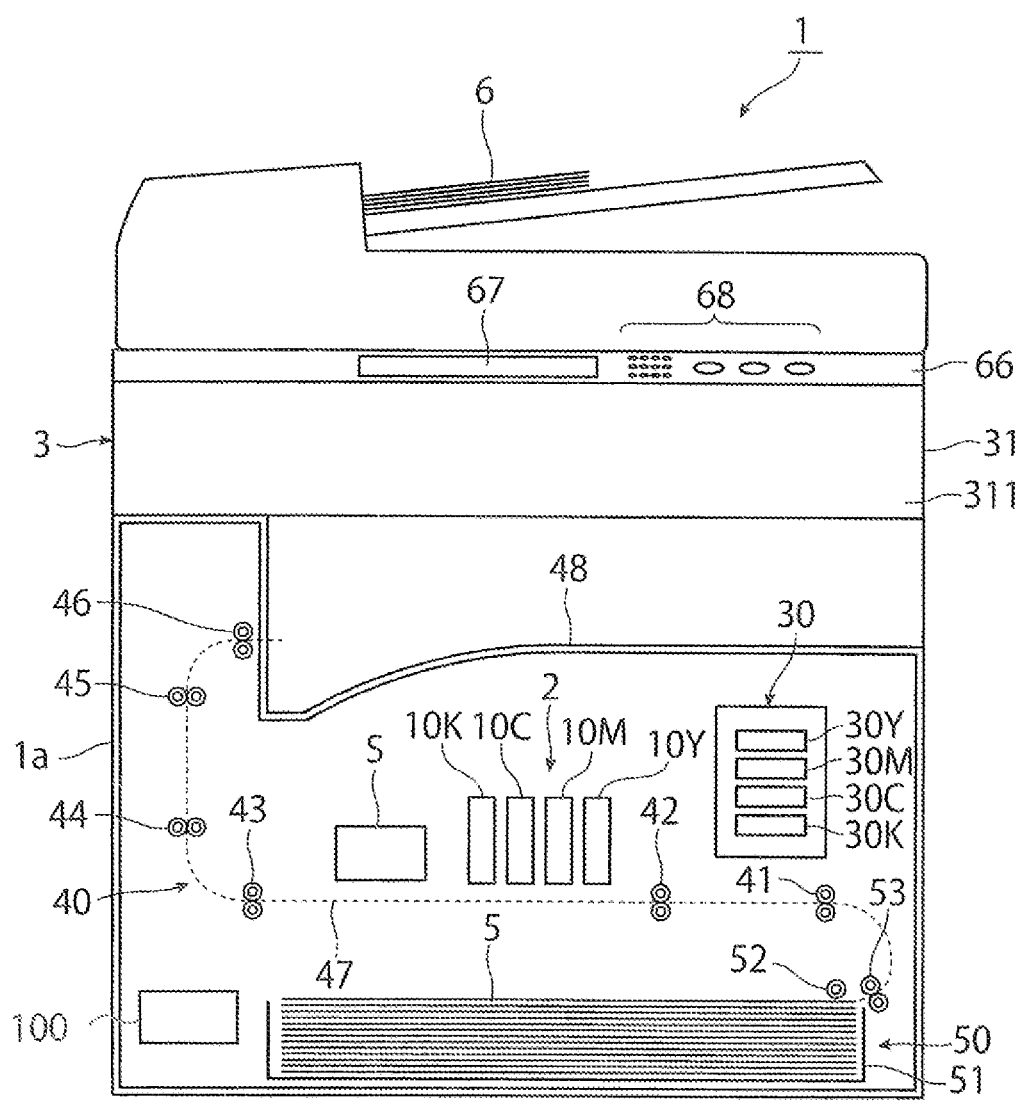
FIG. 17 is an overall configuration view illustrating an image forming apparatus to which an image reading device according to a third exemplary embodiment of the present invention is applied.

FIG. 17 is a configuration view illustrating an overall outline of an image forming apparatus to which an image reading device according to the third exemplary embodiment of the present invention is applied. A description of the same configuration as the first exemplary embodiment will be omitted.

<Overall Configuration of Image Forming Apparatus>

The image forming apparatus 1 according to the third exemplary embodiment is, for example, a color copying machine configured to form a color image using a so-called inkjet method. The image forming apparatus 1 includes the image reading device 3 as an example of an image reading unit configured to read images of documents 6, and the image forming unit 2 as an example of an image forming unit configured to form an image on a recording medium based on image data read by the image reading device 3 or the like. The image reading device 3 is provided above the apparatus body 1a housing the image forming unit 2 and is supported by the support portion 4. A space for ejecting a recording medium on which an image has been formed is formed between the image reading device 3 and the apparatus body 1a.

As illustrated in FIG. 17, the image forming unit 2 includes a plurality of inkjet heads 10 configured to eject ink onto a recording medium to form an image, the sheet feeding device 50 configured to house and convey the required recording sheet 5 as an example of a recording medium to be supplied to an image forming position of each inkjet head 10, a conveyance device 40 configured to convey the recording sheet 5 supplied from the sheet feeding device 50 to an image forming position and then eject the recording sheet 5, and the like. The apparatus body 1a includes a support structure member, an exterior cover, and the like. In the drawing, a broken line indicates a conveyance path through which the recording sheet 5 is conveyed in the apparatus body 1a of the image forming apparatus 1.

The inkjet heads 10 includes inkjet heads 10Y, 10M, 10C, 10K respectively corresponding to ink of colors of yellow (Y), magenta (M), cyan (C), and black (K). The inkjet heads 10Y, 10M, 10C, 10K of the respective colors are sequentially arranged in a conveying direction of the recording sheet 5. Each of the inkjet heads 10 ejects droplets of ink under control of the control device 100 to form an image on the recording sheet 5.

In the inkjet heads 10, a plurality of ink ejection ports (not illustrated) are arranged and formed along a width direction that intersects the conveying direction of the recording sheet 5. Each of the inkjet heads 10 ejects droplets of ink from the ink ejection port according to image information to the recording sheet 5 that is supplied from the sheet feeding device 50 and is conveyed by the conveyance device 40. A method of ejecting droplets of ink by the inkjet heads 10 is not particularly limited, and for example, a thermal method of ejecting droplets of ink with heat or a piezoelectric method of ejecting droplets of ink with pressure using a piezoelectric element or the like may be appropriately used.

Ink of a corresponding color is supplied to each of the inkjet heads 10 from an ink cartridge 30. The ink cartridge 30 includes ink cartridges 30Y, 30M, 30C, 30K respectively corresponding to ink of colors of yellow (Y), magenta (M), cyan (C), and black (K). In each ink cartridge 30, ink of a corresponding color is housed. Specifically, ink of yellow is housed in the ink cartridge 30Y, ink of magenta is housed in the ink cartridge 30M, ink of cyan is housed in the ink cartridge 30C, and ink of black is housed in the ink cartridge 30K.

Each ink cartridge 30 is attachable to and detachable from the apparatus body 1a of the image forming apparatus 1, and is connected to a corresponding one of the inkjet heads 10. Then, each ink cartridge 30 supplies ink of a color to a corresponding one of the inkjet heads 10 under control of the control device 100.

The sheet feeding device 50 is provided at a position below the inkjet heads 10. The sheet feeding device 50 mainly includes the single (or the plurality of) sheet housing body 51 configured to house the recording sheets 5 of a desired size, a desired type, and the like in a stacked state, and delivery devices 52, 53 configured to deliver the recording sheets 5 one by one from the sheet housing body 51. The sheet housing body 51 is attached, for example, so as to be pulled out to a front surface (a side surface that an operator faces during operation) side of the apparatus body 1a.

As the recording sheet 5, in addition to non-coated paper which is plain paper or the like, coated paper, which is coated paper, art paper, or the like and has lower ink absorbency than non-coated paper, may be used. Coated paper is a sheet on which a surface layer is formed by a filler or a binder resin. Examples of the filler include calcium carbonate, magnesium carbonate, kaolin, talc, silica, alumina, titanium dioxide, aluminum hydroxide, and zinc oxide. Examples of the binder resin include a latex which is a styrene-butadiene copolymer, an acrylonitrile-butadiene copolymer, or the like.

The conveyance device 40 is provided with a plurality of sheet conveying rollers 41 to 46 configured to convey the recording sheet 5 delivered from the sheet feeding device 50 to the ejection housing portion 48 provided on the upper part of the apparatus body 1a after passing the recording sheet 5 through an image forming position, and a sheet conveyance path 47 including a conveyance guide (not illustrated). The sheet conveying roller 42 provided immediately before the image forming position in the sheet conveyance path 47 is, for example, a roller (a registration roller) configured to adjust a timing of conveying the recording sheet 5. Further, the sheet conveying roller 46 provided immediately before the ejection housing portion 48 is an ejection roller configured to eject the recording sheet 5 on which an image is formed to the ejection housing portion 48.

In the illustrated example, a fixing device S configured to fix an image formed on the recording sheet 5 by the inkjet heads 10 is provided downstream of the inkjet heads 10 in the conveying direction of the recording sheet 5. It is not necessary to provide the fixing device S.

<Configuration of Image Reading Device>

Figure 18A:
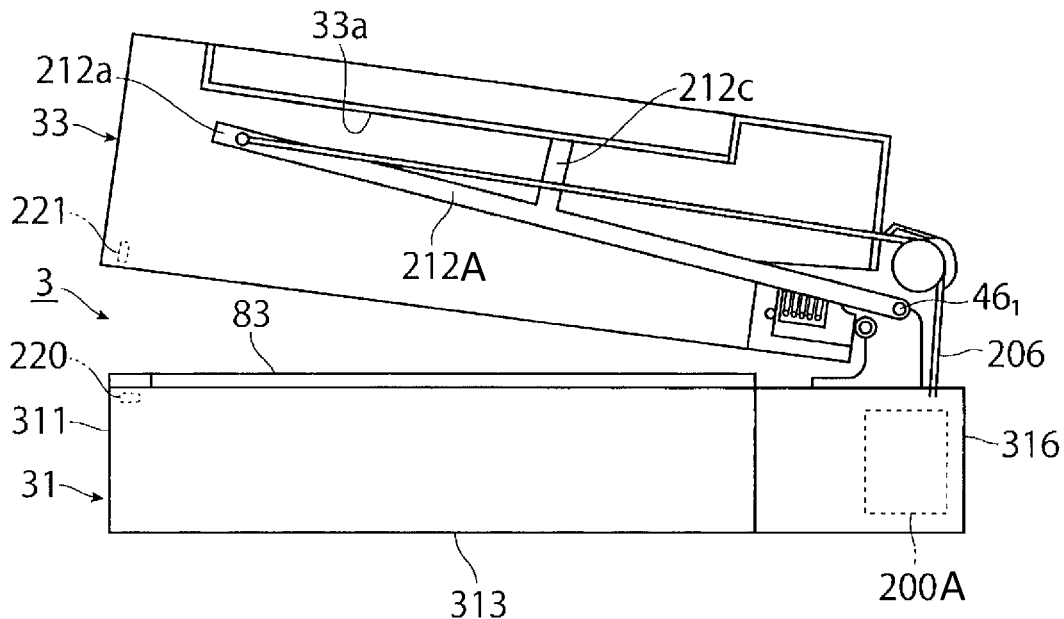
FIG. 18A is a configuration view illustrating a duplex automatic document feeder according to the third exemplary embodiment of the present invention.
Figure 18B:
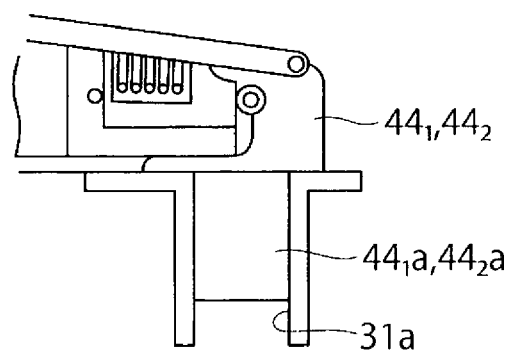
FIG. 18B is a configuration view illustrating a duplex automatic document feeder according to the third exemplary embodiment of the present invention.
Figure 18C:
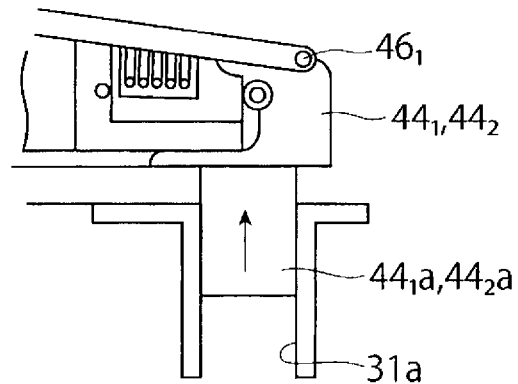
FIG. 18C is a configuration view illustrating a duplex automatic document feeder according to the third exemplary embodiment of the present invention.
Figure 19:
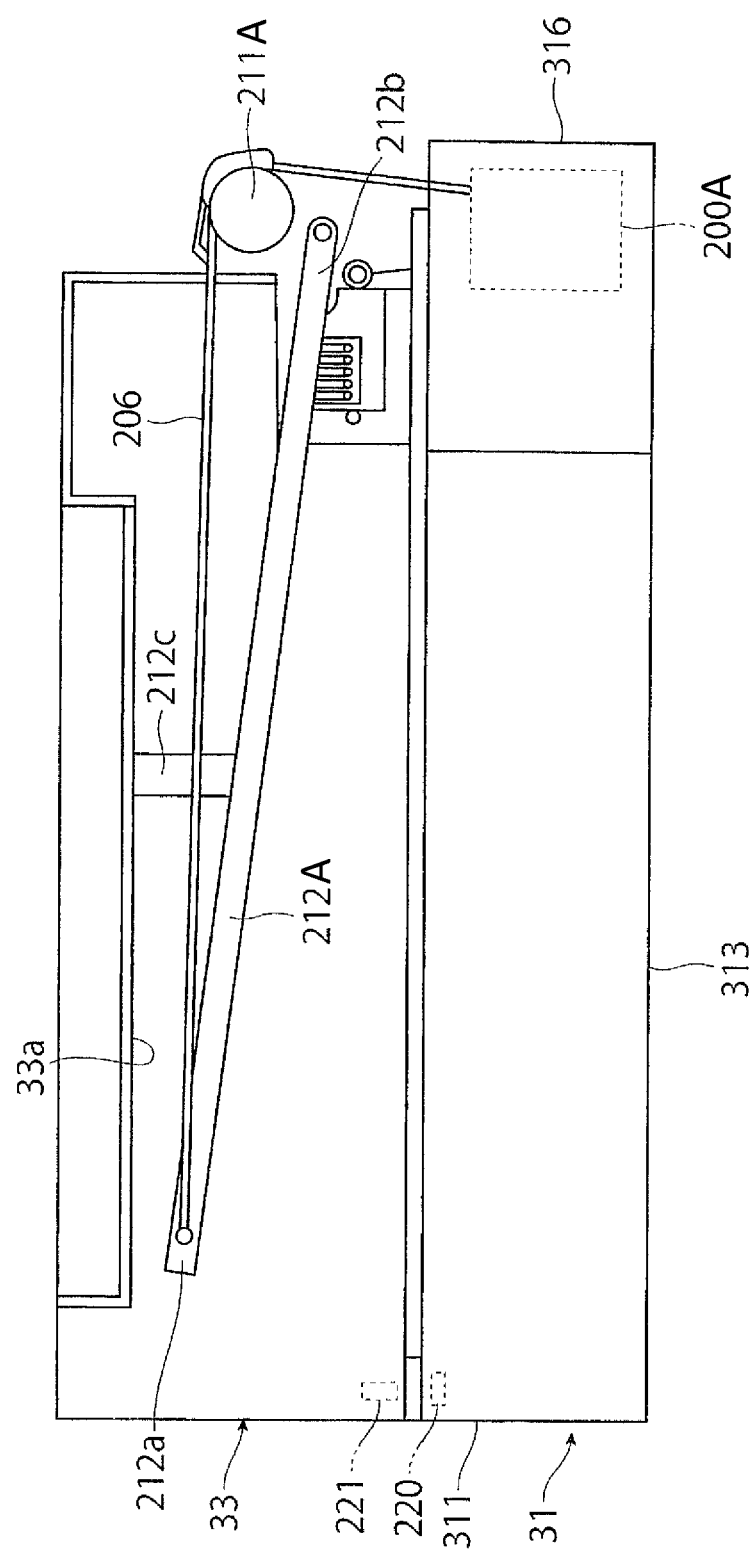
FIG. 19 is a configuration view illustrating a state in which the duplex automatic document feeder according to the third exemplary embodiment of the present invention is closed.

Therefore, as illustrated in FIGS. 18A, 18B, and 18C, the image reading device 3 according to the third exemplary embodiment includes the duplex automatic document feeder 33 that is openably and closably attached to the housing 31 and is configured to convey the documents 6 to a reading position, and a pull-up force applying unit (for example, a pull-up device 200A) configured to only temporarily apply a drive force of the drive motor 34 as a pull-up force for pulling up the duplex automatic document feeder 33 in an opening direction when the duplex automatic document feeder 33 is opened.

In the image reading device 3 according to the third exemplary embodiment, the pull-up force applying unit includes a pull-up force applying member provided inside the duplex automatic document feeder 33 so as to be rotatable about a rotation shaft as a fulcrum, and a wire member configured to apply a pull-up force in a direction of opening the duplex automatic document feeder 33 to an end of the pull-up force applying member opposite to the rotation shaft.

As illustrated in FIG. 18A, in the image reading device 3 according to the third exemplary embodiment, the pull-up device 200A is provided on a back side in the housing 31 of the image reading device 3 as an example of the pull-up force applying unit configured to cause a drive force of a drive source to only temporarily act on the duplex automatic document feeder 33 as a pull-up force for pulling up the duplex automatic document feeder 33 in the opening direction when an operator opens the duplex automatic document feeder 33.

Figure 20:
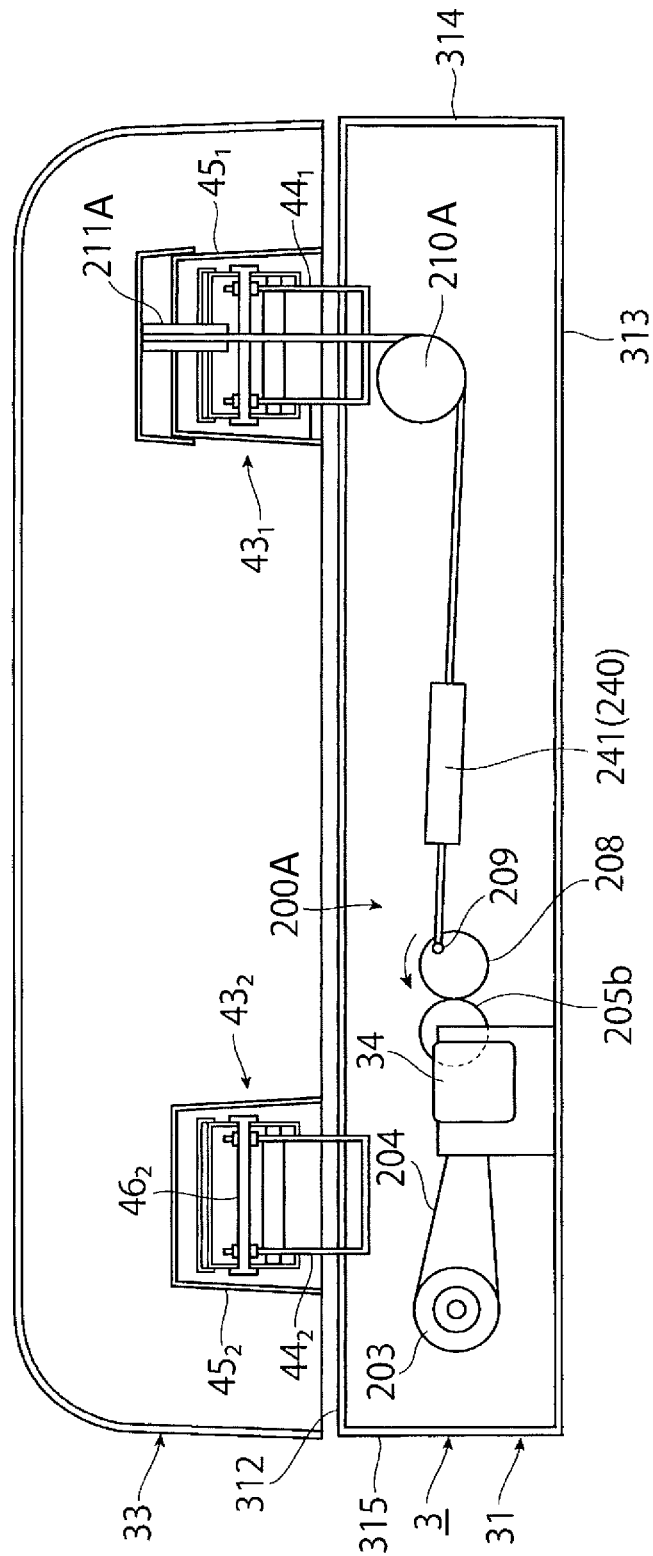
FIG. 20 is a configuration view illustrating a main part of the duplex automatic document feeder according to the third exemplary embodiment of the present invention.

In the third exemplary embodiment, as illustrated in FIG. 20, the pull-up device 200A does not include a drive source thereof, and uses the drive motor 34 configured to drive a reading optical system of the image reading device 3 as a drive source. Of course, the pull-up device 200A may include a drive source thereof.

Figure 21:
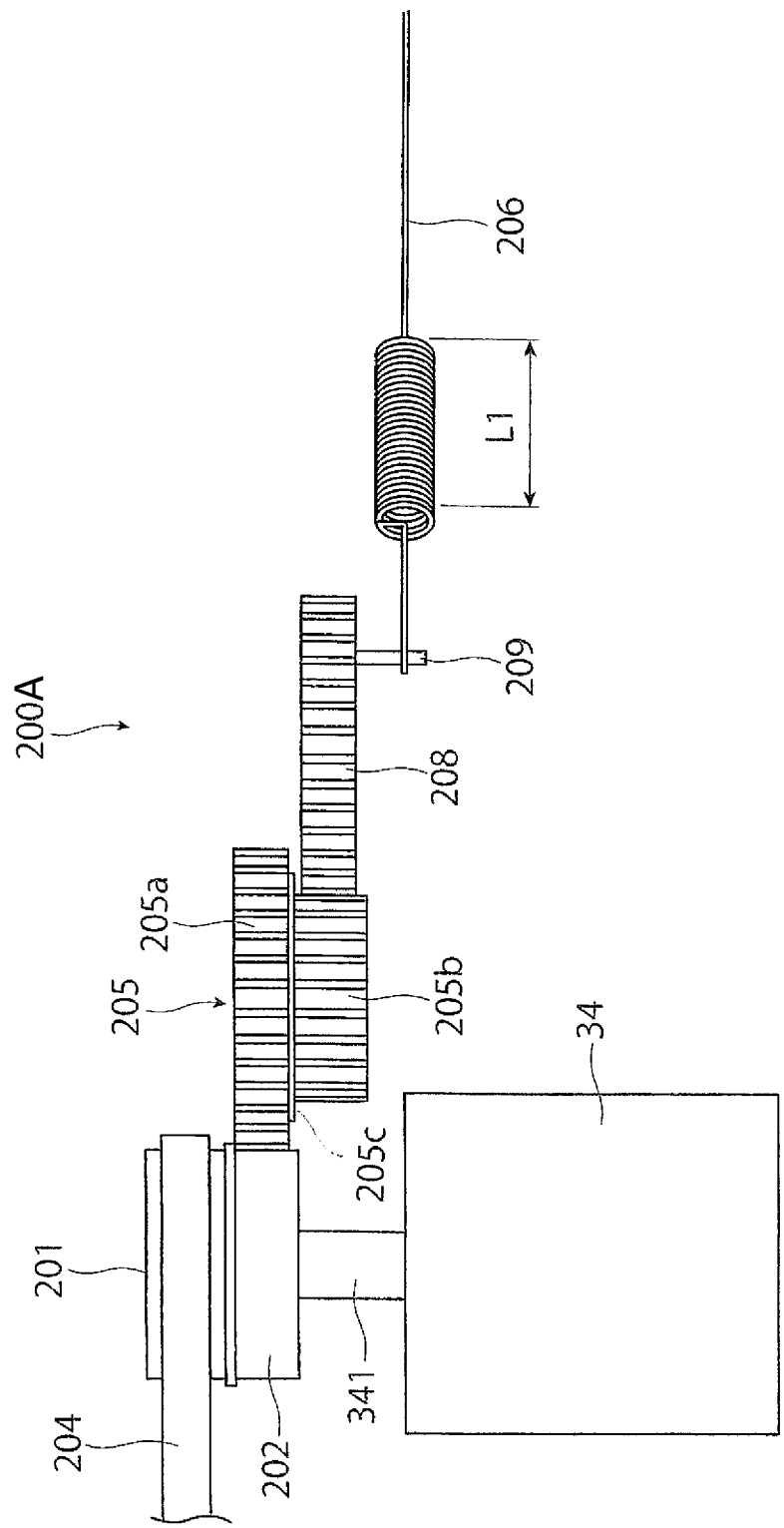
FIG. 21 is a plan configuration view illustrating a push-up device.
Figure 22:
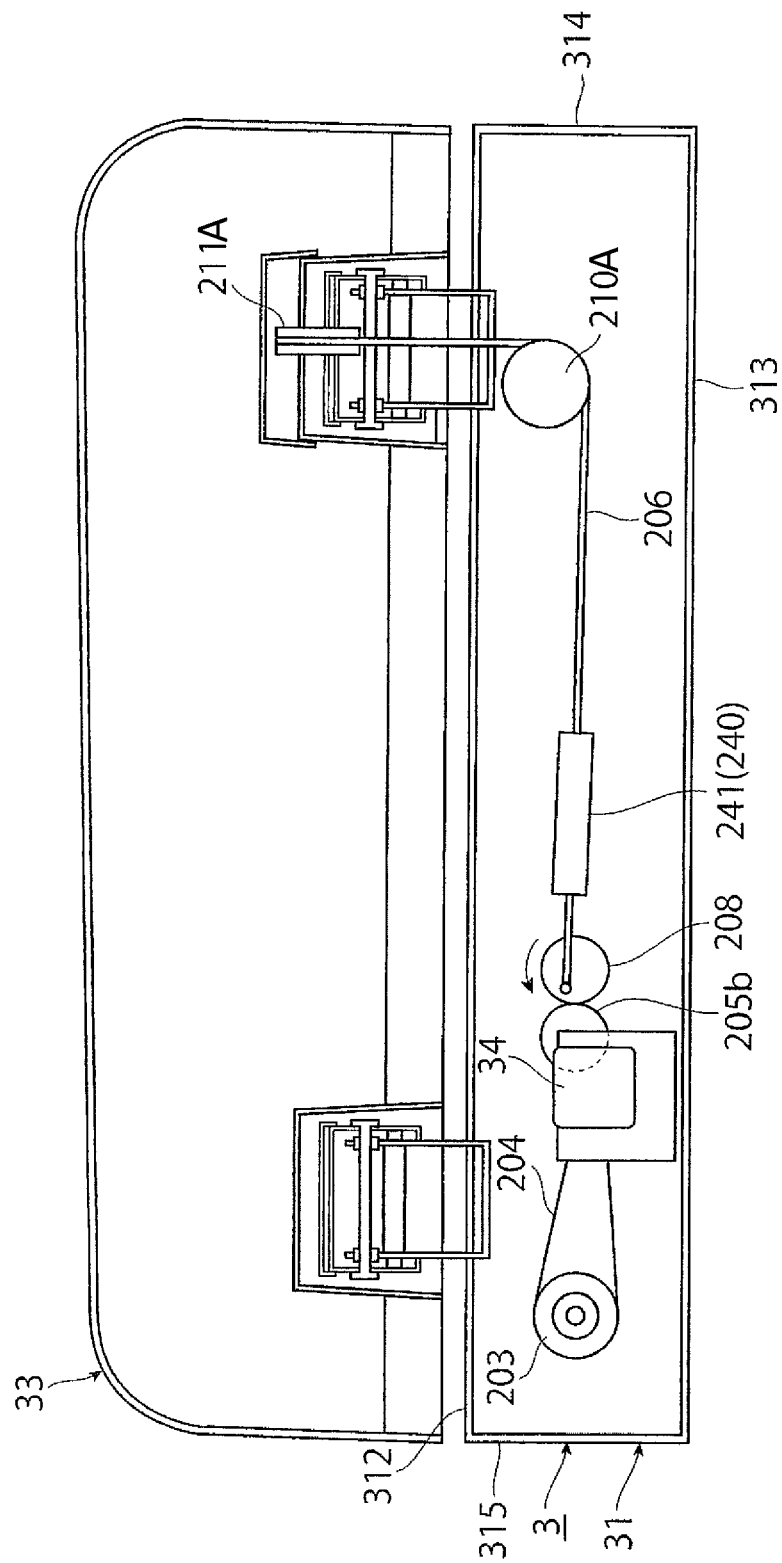
FIG. 22 is a configuration view illustrating a main part of the duplex automatic document feeder according to the third exemplary embodiment of the present invention.
Figure 23:
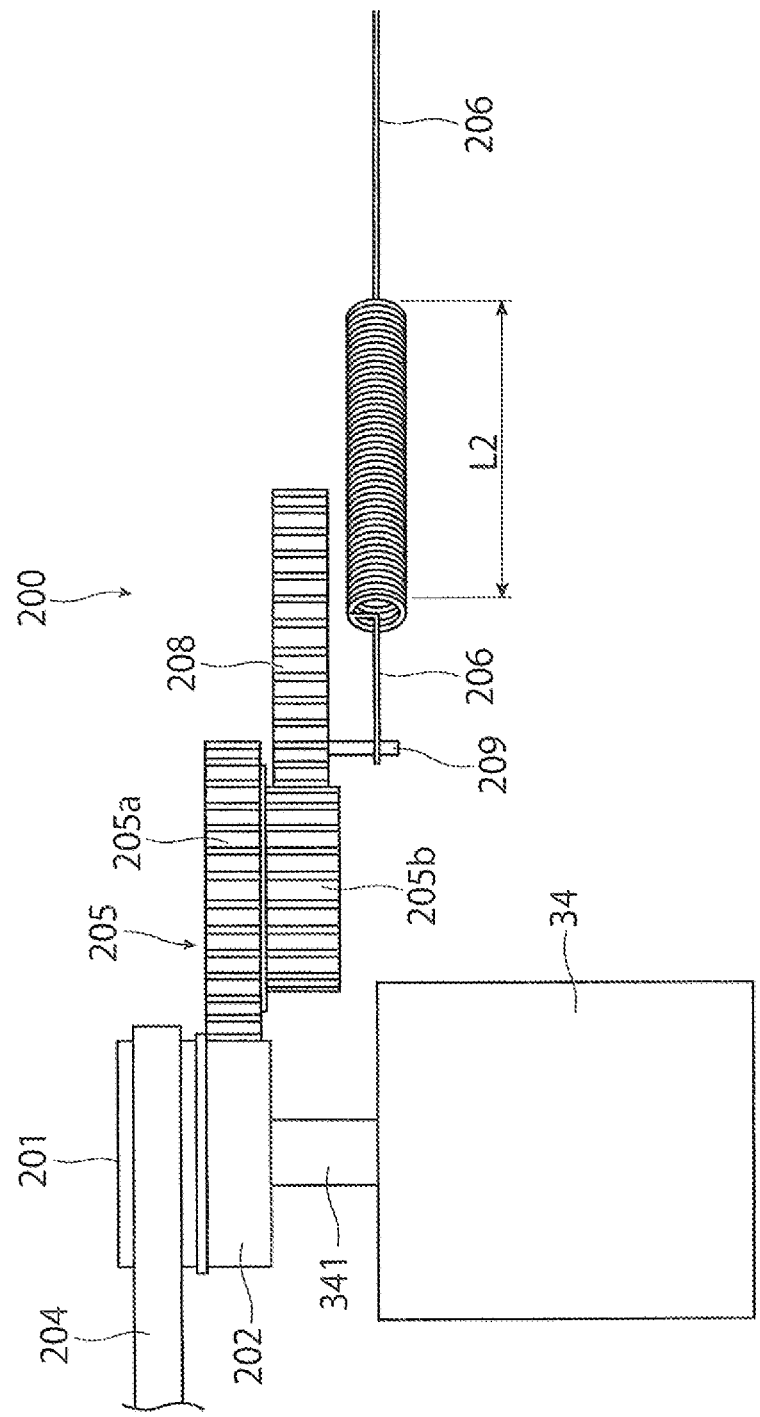
FIG. 23 is a plan configuration view illustrating the push-up device.

As illustrated in FIG. 21, the drive gear 202 configured to drive the pull-up device 200A together with the drive pulley 201 configured to drive the reading optical system is attached to the drive shaft 341 of the drive motor 34. As illustrated in FIG. 20, the timing belt 204 is wound around the drive pulley 201 between the drive pulley 201 and the driven pulley 203 configured to drive the reading optical system of the image reading device 3.

As illustrated in FIG. 21, the drive motor 34 is rotationally driven in a normal rotation direction and a reverse rotation direction when images of the documents 6 are read in the second reading mode. The drive gear 202 is meshed with the drive force transmission gear 205 including the electromagnetic clutch 205c as an example of a switching unit configured to switch whether to transmit a rotational drive force of the drive motor 34 to the pull-up device 200A. The drive force transmission gear 205 includes the first drive force transmission gear 205a having a relatively large outer diameter on an input side and the second drive force transmission gear 205b having a relatively small outer diameter on an output side. The second drive force transmission gear 205b is meshed with the reciprocating gear 208 configured to reciprocate the drive wire 206, which is an example of the wire member.

The engagement pin 209 is provided on an outer peripheral end of one side surface of the reciprocating gear 208 and protrudes laterally. One end of the drive wire 206 is rotatably engaged with the engagement pin 209.

An end of the drive wire 206 along the horizontal direction is wound around a first pulley 210A rotatably provided inside the housing 31 of the image reading device 3 illustrated in FIG. 20, and a direction of a front end of the drive wire 206 is changed upward along the vertical direction. The front end of the drive wire 206 is wound around a second pulley 211A rotatably provided at a position corresponding to the first shaft support member $43_1$ in a back surface part of the duplex automatic document feeder 33, and then is introduced into the duplex automatic document feeder 33.

As illustrated in FIG. 18A, in the duplex automatic document feeder 33, an opening arm member 212A formed in an elongated plate shape is rotatably provided with the rotation shaft $46_1$ of the first shaft support member $43_1$ as a fulcrum. The opening arm member 212A is extended such that a front end of the opening arm member 212A is located near a front end of the duplex automatic document feeder 33. The front end of the drive wire 206 is connected and fixed to a front end 212a of the opening arm member 212A. The opening arm member 212A is integrally provided with a short acting arm 212c that is branched upward in the vertical direction from an intermediate part in a longitudinal direction of the opening arm member 212A. A front end of the acting arm 212c of the opening arm member 212A abuts against a ceiling wall 33a provided on an upper part of the duplex automatic document feeder 33.

When the reciprocating gear 208 is rotated in a required direction by rotationally driving the drive motor 34, the pull-up device 200A pulls and moves the drive wire 206 leftward in FIG. 20. One end of the drive wire 206 is rotatably engaged with the engagement pin 209 provided on the reciprocating gear 208. Movement of the drive wire 206 is transmitted to the opening arm member 212A provided inside the duplex automatic document feeder 33 via the first and second pulleys 210A, 211A, and the opening arm member 212A rotates in a clockwise direction in FIG. 18A. When the opening arm member 212A rotates in the clockwise direction in FIG. 18A, a front end of the acting arm 212c abuts against the ceiling wall 33a provided on the upper part of the duplex automatic document feeder 33, and pulls up the duplex automatic document feeder 33 in the clockwise direction.

Then, as the opening arm member 212A rotates in the clockwise direction in the drawing, the ceiling wall 33a of the duplex automatic document feeder 33 is pulled up by the acting arm 212c of the opening arm member 212A to assist an operator in opening the duplex automatic document feeder 33.

The front end 212a of the opening arm member 212A along the longitudinal direction of the opening arm member 212A is a force point to which a pull-up force is applied by the drive wire 206. The front end of the acting arm 212c located in a middle of the opening arm member 212A in the longitudinal direction is an action point at which a pull-up force is actually applied to the ceiling wall 33a of the duplex automatic document feeder 33. Therefore, in the pull-up device 200A as illustrated in FIG. 18A, a large pull-up force due to lever action proportional to a distance from a base end 212b to the front end 212a of the opening arm member 212A and a distance from the base end 212b to the acting arm 212c is applied with respect to a rotation moment with which the drive wire 206 rotates the front end 212a in the clockwise direction in the drawing.

When an operator opens the duplex automatic document feeder 33, the drive motor 34 is only temporarily driven for the predetermined time T and pulls up the duplex automatic document feeder 33 via the drive wire 206. After opening the duplex automatic document feeder 33 by a set angle larger than the predetermined angle $\theta$ by several degrees (1 to 2 degrees), the drive motor 34 is stopped and is immediately and rotationally rotated in a reverse direction to complete pull-up operation of the duplex automatic document feeder 33.

The drive wire 206 may not rotatably be connected to the reciprocating gear 208 via the engagement pin 209, but may include a take-up reel (not illustrated) instead of the reciprocating gear 208. One end of the drive wire 206 may be fixed to the take-up reel, and the drive wire 206 may be taken up by the take-up reel.

When the image reading device 3 according to the third exemplary embodiment is in a state in which a heavy object such as a book is placed on the duplex automatic document feeder 33 when the duplex automatic document feeder 33 is closed, the duplex automatic document feeder 33 may not be opened even if the drive wire 206 is driven, and an excessive load may be applied to the drive motor 34 configured to drive the drive wire 206.

In the image reading device 3 according to the third exemplary embodiment, after an operator has once opened the duplex automatic document feeder 33, the operator may close the duplex automatic document feeder 33 before the duplex automatic document feeder 33 opens by the predetermined angle $\theta$. Then, in the image reading device 3, the duplex automatic document feeder 33 may be forcibly closed while the drive wire 206 is driven to open the duplex automatic document feeder 33 by the predetermined angle $\theta$, and an excessive load may be applied to the drive motor 34 configured to drive the drive wire 206.

Therefore, the image reading device 3 according to the third exemplary embodiment includes the absorption portion 240 configured to absorb an excessive force exceeding a predetermined value when the excessive force acts on the pull-up device 200A. The absorption portion 240 is, for example, an elastic member configured to absorb an excessive force by elastically deforming when the excessive force acts on the pull-up device 200A.

Figure 24:
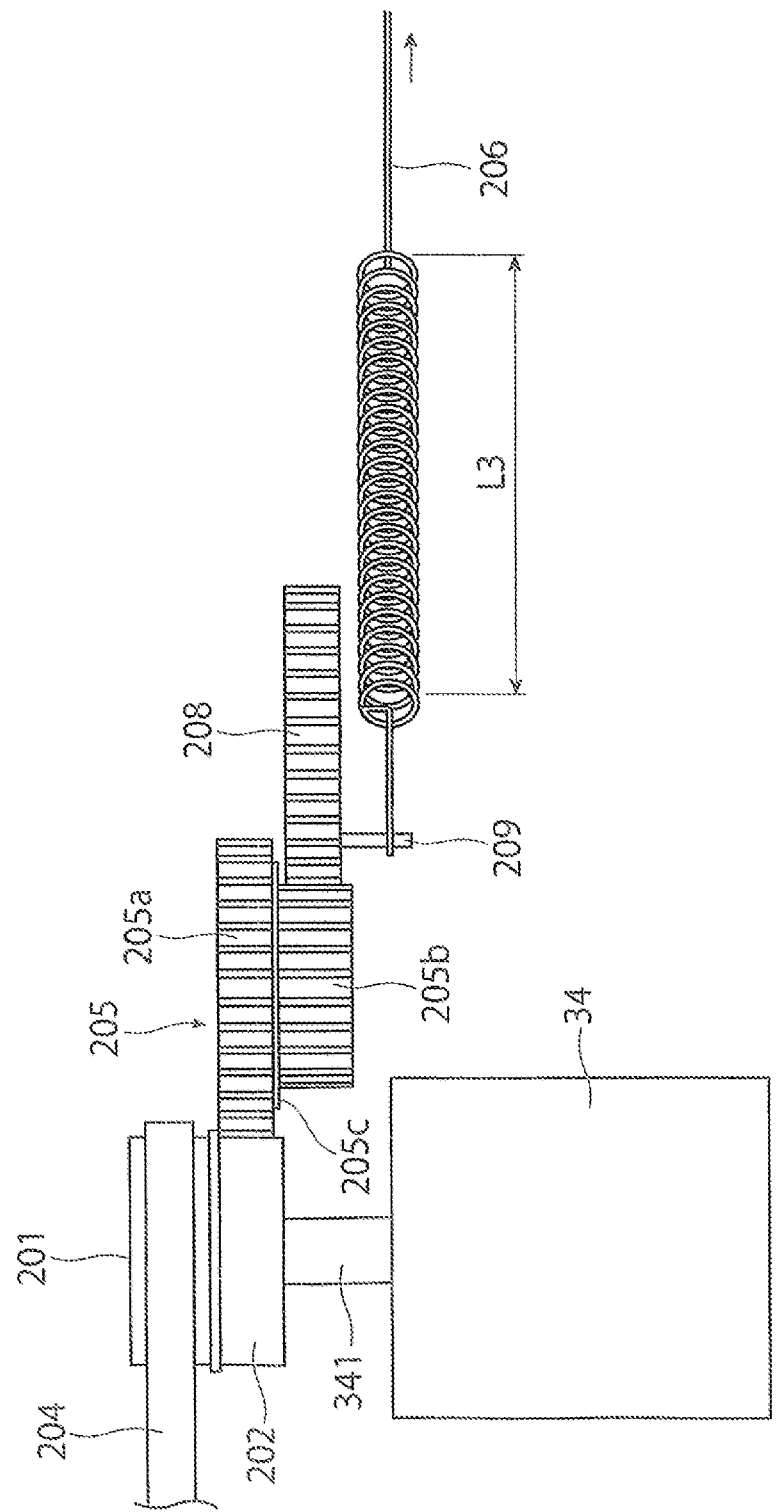
FIG. 24 is a configuration view illustrating a main part of the duplex automatic document feeder according to the third exemplary embodiment of the present invention.

More specifically, in the image reading device 3, the coil spring 241, which is an example of the absorption portion 240, is interposed in a middle of the drive wire 206 configured to transmit a drive force of the drive motor 34 to the duplex automatic document feeding device 33 as a pull-up force. The coil spring 241 has a required spring constant. The spring constant of the coil spring 241 is set to a value that is larger than a tension acting on the drive wire 206 when the drive wire pulls up the duplex automatic document feeder 33 and that is smaller than a tension when a load exceeding a predetermined value acts on the pull-up device 200A as in a case in which a heavy object is placed on the duplex automatic document feeder 33. Therefore, the coil spring 241 extends to the certain length L2 when the drive wire pulls up the duplex automatic document feeder 33. However, as illustrated in FIG. 24, the length L2 of the coil spring 241 is shorter than the length L3 when a load exceeding a predetermined value acts on the pull-up device 200A. The coil spring 241 has a length L1 in a state before a tension acts on the drive wire 206.

In the third exemplary embodiment, when an excessive load is applied to the drive motor 34, the coil spring 241 is extended to absorb the excessive load acting on the drive motor 34. Therefore, the drive motor 34 is prevented from generating heat due to an overload and being disconnected, or teeth of the reciprocating gear 208 configured to transmit a drive force is prevented from being chipped or out of step.

In the image reading device 3, as illustrated in FIG. 20, when the drive motor 34 is rotationally driven, the drive force transmission gear 205 is rotationally driven by the drive motor 34. In the drive force transmission gear 205, since the electromagnetic clutch 205c is in an on state, a rotational drive force from the drive motor 34 is transmitted to the second drive force transmission gear 205b, and the reciprocating gear 208 is rotationally driven by a required angle in the counterclockwise direction in the drawing.

Then, a tension is applied to the drive wire 206 whose one end is connected to the reciprocating gear 208, and the front end 212a of the opening arm member 212A provided inside the duplex automatic document feeder 33 is pulled up in the clockwise direction via the coil spring 241, the first and second pulleys 210A, 211A.

When the opening arm member 212A is pulled up in the clockwise direction by the drive wire 206 connected to the front end 212a of the opening arm member 212A, the opening arm member 212A also rotates in the clockwise direction. Then, the acting arm 212c provided in the middle of the opening arm member 212A abuts against the ceiling wall 33a of the duplex automatic document feeder 33 and pulls up the duplex automatic document feeder 33 in the opening direction to open the duplex automatic document feeder 33.

Therefore, when an operator opens the duplex automatic document feeder 33, since operation of opening the duplet automatic document feeder 33 is assisted by pull-up operation of the drive wire 206, it is possible to easily open the duplex automatic document feeder 33 regardless of a weight of the duplex automatic document feeder 33.

As shown in FIG. 6, an angle at which the drive wire 206 opens the duplex automatic document feeder 33 is set to a set angle larger than the predetermined angle $\theta$ by several degrees (1 to 2 degrees). Therefore, after the operation of opening the duplex automatic document feeder 33 has been assisted by the drive wire 206, an operator may easily open the duplex automatic document feeder 33 to a fully open position with the combined rotation moment $M_T$ acting by the counter balance provided in the first and second shaft support members $43_1$, $43_2$.

When the time measuring unit 102 measures that the predetermined time T has elapsed, the control unit 101 of the control device 100 stops the drive motor 34 and then rotationally drives the drive motor 34 in a reverse direction by the predetermined time T immediately. The control unit 101 stops the drive motor 34, and at the same time, turns off the electromagnetic clutch 205c.

Then, as illustrated in FIG. 20, as the drive motor 34 rotates in a reverse direction, the drive wire 206 whose one end is connected to the reciprocating gear 208 moves rightward in the drawing.

When the drive wire 206 moves rightward in the drawing, the opening arm member 212A connected to an inside of the duplex automatic document feeder 33 via the first and second pulleys 210A and 211A also rotates in the counter-clockwise direction, and is separated from the ceiling wall 33a of the duplex automatic document feeder 33.

In the third exemplary embodiment, since the electromagnetic clutch 205c is turned off, the second drive force transmission gear 205b of the drive force transmission gear 205 is freely rotatable, and operation of pulling the drive wire 206 is released.

As described above, in the image reading device 3 according to the third exemplary embodiment, an operator detects the operation of opening the duplex automatic document feeder 33 by the reed switch 220 and drives the drive motor 34, so that the duplex automatic document feeder 33 is temporarily pushed up by the drive wire 206 and the opening arm member 212A. Therefore, even when the duplex automatic document feeder 33 has a relatively large weight, operation of opening the duplex automatic document feeder 33 performed by an operator is assisted by the drive motor 34, and the operation of opening the duplex automatic document feeder 33 may be easily performed.

In the image reading device 3 according to the third exemplary embodiment, when a heavy object such as a book (not illustrated) is placed on the duplex automatic document feeder 33, or when an operator performs closing operation of the duplex automatic document feeder 33 during the opening operation of the duplex automatic document feeder 33, as illustrated in FIG. 24, since the coil spring 241 is interposed in the middle of the drive wire 206, the coil spring 241 expands by the length L3 to absorb an excessive load, and the excessive load is prevented from acting on the drive motor 34.

Therefore, according to the image reading device 3 according to the third exemplary embodiment, it is possible to reduce an operation force when the duplex automatic document feeder 33 is opened without impairing operability as compared with the case in which the duplex automatic document feeder 33 is driven to open and close over all opening and closing angles.

In the above-described exemplary embodiment, the image reading device is applied to a color copying machine as an example of an image forming apparatus. However, the present invention is not limited thereto, and the image reading device may be used as a scanner, a fax machine, or the like.

In the above-described exemplary embodiment, the coil spring is used as an absorption portion. However, as the absorption portion, a torque limiter configured to limit driving torque may be provided on the drive force transmission gear 205 or the like.

Fourth Exemplary Embodiment

Next, an image reading device according to the fourth exemplary embodiment of the present invention will be described. A description of the same configuration as the first exemplary embodiment will be omitted.

The image reading device 3 according to the fourth exemplary embodiment includes the duplex automatic document feeder 33 that is openably and closably attached to the housing 31 and is configured to convey the documents 6 to a reading position, a restoring force applying unit that is compressed and deformed to apply an elastic restoring force in an opening direction to the duplex automatic document feeder 33, and a releasing unit configured to release compressive deformation of the restoring force applying unit by being held by an operator with a hand when the operator opens the duplex automatic document feeder 33.

Figure 25:
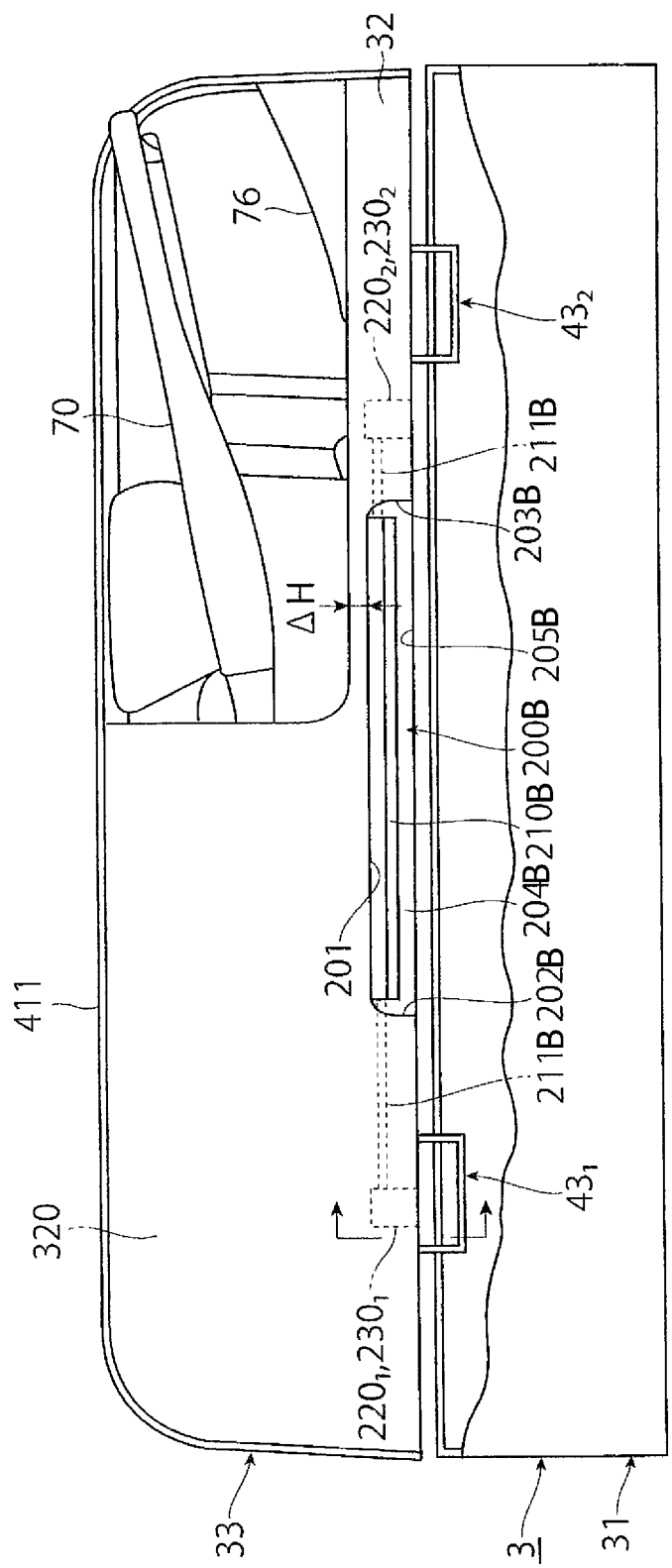
FIG. 25 is a front configuration view illustrating a duplex automatic document feeder according to a fourth exemplary embodiment of the present invention.
Figure 26:
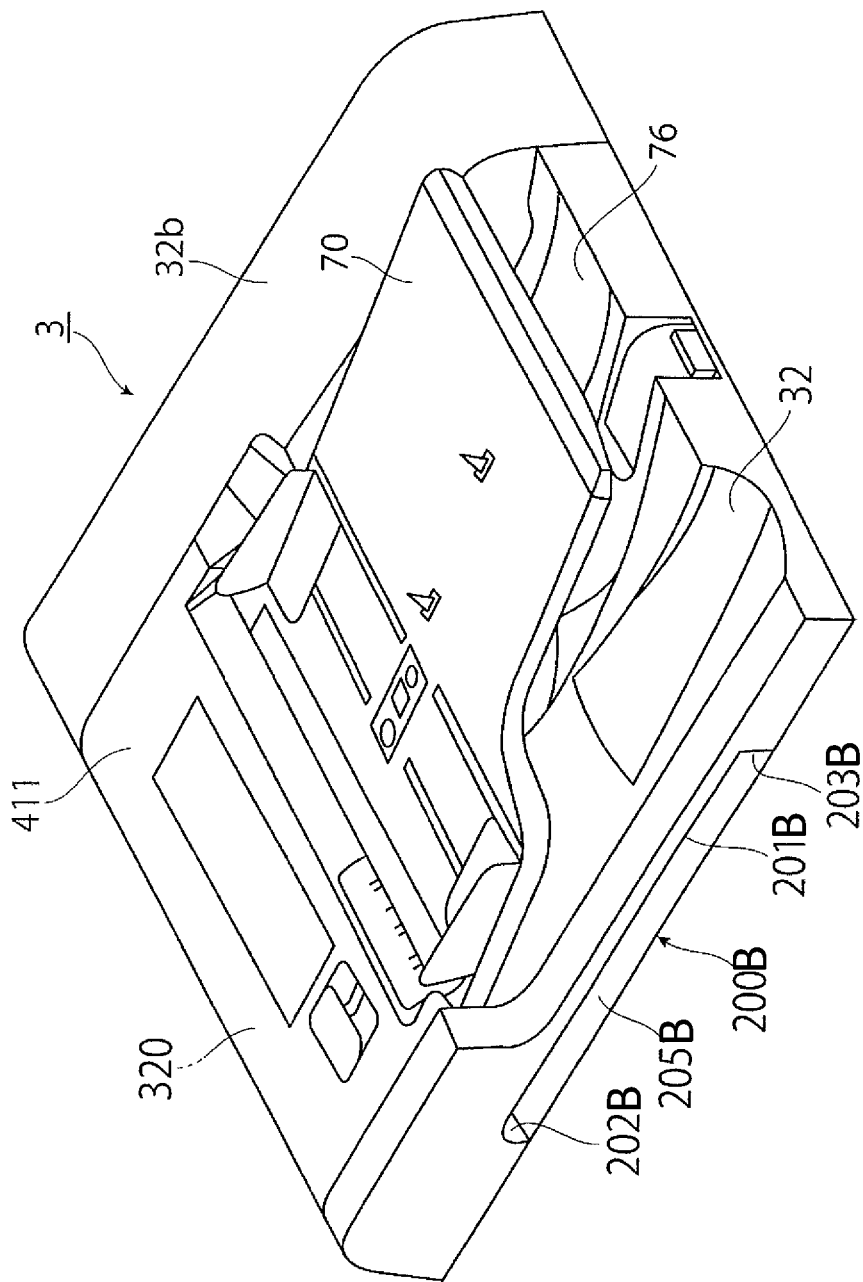
FIG. 26 is a perspective configuration view illustrating the duplex automatic document feeder according to the fourth exemplary embodiment of the present invention.

As illustrated in FIGS. 25 and 26, the duplex automatic document feeder 33 of the image reading device 3 includes the document pressing cover 32 including a flat lower end surface. The duplex automatic document feeder 33 is provided with an opening and closing cover 411 configured to cover the sheet conveyance device 320 provided in an end on a left side of the duplex automatic document feeder 33. In the duplex automatic document feeder 33, an upper end surface of the document pressing cover 32 forms the ejection housing portion 76 configured to eject the documents 6. The duplex automatic document feeder 33 includes, at an end of a back side of the duplex automatic document feeder 33, a support structure portion 32b (see FIG. 26) configured to integrally support the document pressing cover 32, the sheet conveyance device 320, and the like over an entire region along a width direction of the duplex automatic document feeder 33.

At a lower end part on a front side of the duplex automatic document feeder 33, an operation portion 200B is formed at a central part of the duplex automatic document feeder 33 in the width direction of the duplex automatic document feeder 33. When opening and closing the duplex automatic document feeder 33, an operator grips the operation portion 200B with a hand to open and close the duplex automatic document feeder 33. The operation portion 200B is an elongated recess having a required width along the width direction of the duplex automatic document feeder 33.

More specifically, the operation portion 200B includes a ceiling surface 201B provided at a position having a required height from a lower end surface of the duplex automatic document feeder 33, left and right side surfaces 202B, 203B provided at a required interval along the width direction of the duplex automatic document feeder 33, a back surface 204B (see FIG. 25) provided on a back side of the duplex automatic document feeder 33 with a required depth, and a bottom surface 205B provided at a lower end of the duplex automatic document feeder 33. The operation portion 200B is formed as an elongated and substantially rectangular parallelepiped recess including an open front surface. As illustrated in FIG. 25, the ceiling surface 201B of the operation portion 200B is located below an upper end surface located at a front end of the duplex automatic document feeder 33 by a required height ΔH. The required height ΔH corresponds to a thickness of a grip portion when an operator inserts a hand into the operation portion 200B and grips the operation portion 200B. The operation portion 200B may be an elongated recess including an open front surface and an open bottom surface and not including the bottom surface 205B.

Figure 27A:
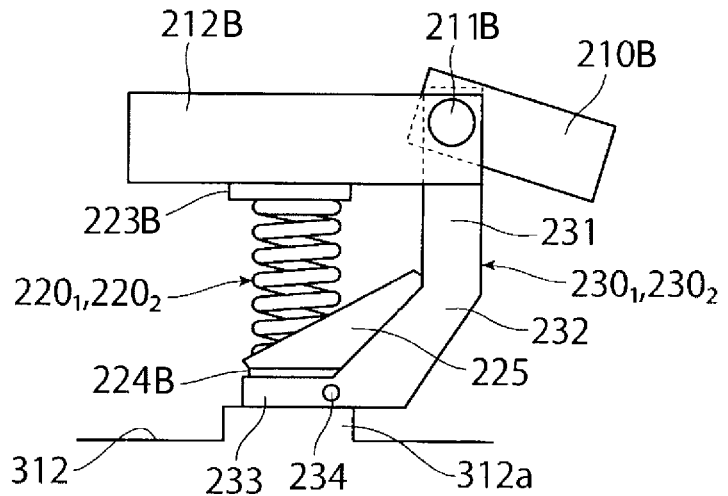
FIG. 27A is a configuration view illustrating a main part of the duplex automatic document feeder according to the fourth exemplary embodiment of the present invention.
Figure 27B:
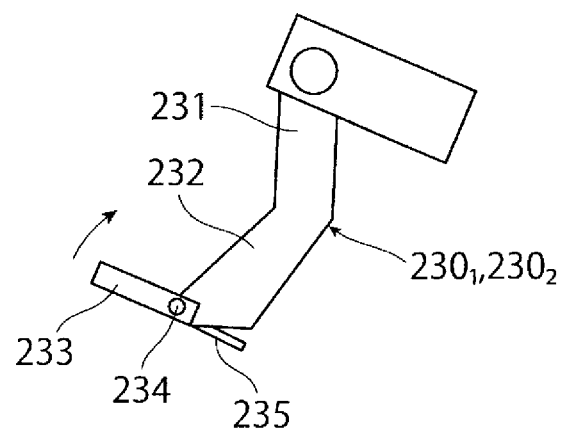
FIG. 27B is a configuration view illustrating a main part of the duplex automatic document feeder according to the fourth exemplary embodiment of the present invention.
Figure 27C:
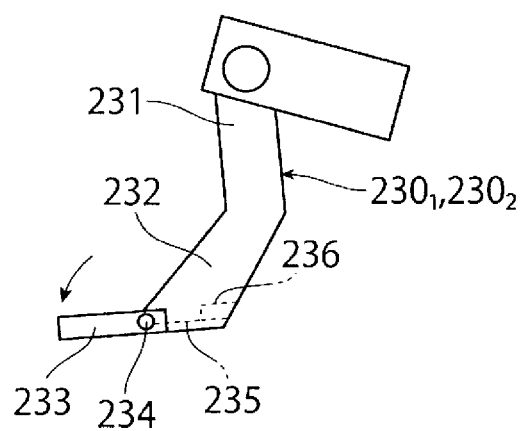
FIG. 27C is a configuration view illustrating a main part of the duplex automatic document feeder according to the fourth exemplary embodiment of the present invention.

In the operation portion 200B of the duplex automatic document feeder 33, as illustrated in FIG. 25, an operation lever 210B, which is an example of a grip portion that is gripped by a hand to open and close the duplex automatic document feeder 33 when an operator opens and closes the duplex automatic document feeder 33, is rotatably mounted. As illustrated in FIGS. 27A, 27B, and 27C, the operation lever 210B is formed in an elongated flat plate shape corresponding to a shape of the operation portion 200B. The operation lever 210B is attached in a state of being fixed to a rotation shaft 211B provided at an end on a back side of the operation portion 200B along a depth direction of the operation portion 200B. The operation lever 210B is biased in a clockwise direction in the drawing by a biasing portion such as a torsion spring (not illustrated) provided on the rotation shaft 211B. The rotation shaft 211B is a shaft-shaped member longer than a length of the operation portion 200B in the width direction of the operation portion 200B.

As illustrated in FIGS. 25, 27A, 27B, and 27C, the rotation shaft 211B are rotatably attached to the inside of the duplex automatic document feeder 33 such that both ends of the rotation shaft 211B in an axial direction of the rotation shaft 211B pass through the left and right side surfaces 202B, 203B of the operation portion 200B. A flat support plate portion 212B configured to rotatably support the rotation shaft 211B is provided inside the duplex automatic document feeder 33.

In the duplex automatic document feeder 33, each of first and second coil springs $220_1$, $220_2$ and first and second latch members $230_1$, $230_2$ are provided at a corresponding one of both ends along an axial direction of the rotation shaft 211B. The first and second coil springs $220_1$, $220_2$ are examples of the restoring force applying unit that is compressed and deformed to apply an elastic restoring force in the opening direction to the duplex automatic document feeder 33. The first and second latch members $230_1$, $230_2$ are examples of the releasing unit configured to release compressive deformation of the first and second coil springs $220_1$, $220_2$ by being held by an operator with a hand when the operator opens the duplex automatic document feeder 33. The number of the coil spring 220B and the latch member 230 is not limited to two. Only one coil spring 220B and only one latch member 230 may be provided, or three or more coil springs 220B and three or more latch members 230 may be provided.

As illustrated in FIG. 27A, the first and second coil springs $220_1$, $220_2$ are formed of a linear material having elasticity which is steel, stainless steel, synthetic resin, or the like, are formed in a spiral shape having a required outer diameter, and have a predetermined spring constant. It is not necessary for the spring constants of the first and second coil springs $220_1$, $220_2$ to be equal. The first and second coil springs $220_1$, $220_2$ may be set such that, for example, the spring constant of the first coil spring $220_1$ provided on a sheet conveyance device 320 side is larger than the spring constant of the second coil spring $220_2$.

The first and second coil springs $220_1$, $220_2$ are attached to the support plate portion 212B via a disc-shaped fixing member 223B fixed to upper ends of the first and second coil springs $220_1$, $220_2$ in a state of being fixed to the support plate portion 212B using a method which is adhesion, screwing, or the like. A disk-shaped buffer member 224B formed of an elastic material which is rubber or the like is fixed to lower ends of the first and second coil springs $220_1$, $220_2$ using a method which is adhesion or the like. The lower ends of the first and second coil springs $220_1$, $220_2$ are free ends that are not fixed to other members.

Each of holding members 225 is fixed to a corresponding one of the lower ends of the first and second coil springs $220_1$, $220_2$ to hold postures of the first and second coil springs $220_1$, $220_2$ in an upper-lower direction along the vertical direction by abutting against a corresponding one of the first and second latch members $230_1$, $230_2$. The holding members 225 include substantially triangular side surfaces. In the holding members 225, a pair of left and right plate-shaped members are connected to each other at a position on a front surface side (a right side in the drawing) with the lower ends of the first and second coil springs $220_1$, $220_2$ sandwiched therebetween and extend toward a front surface side of the housing 31. The holding members 225 are fixed to the lower ends of the first and second coil springs $220_1$, $220_2$ using a method which is adhesion or the like. The buffer member 224B is provided on lower surfaces of the holding members 225. The holding members 225 are not necessarily provided as long as the postures of the first and second coil springs $220_1$, $220_2$ may be held in the upper-lower direction along the vertical direction. In this case, for example, a configuration may be used in which the postures of the first and second coil springs $220_1$, $220_2$ are held in the upper-lower direction along the vertical direction by providing shaft-shaped or cylindrical members shorter than the first and second coil springs $220_1$, $220_2$ inside the first and second coil springs $220_1$, $220_2$.

In terms of the first and second coil springs $220_1$, $220_2$, as illustrated in FIG. 25, the first coil spring $220_1$ is provided at a position corresponding to the first shaft support member $43_1$, and the second coil spring $220_2$ is provided inward of the second shaft support member $43_2$ along a width direction of the housing 31 of the duplex automatic document feeder 33. A weight of the duplex automatic document feeder 33 along the width direction of the duplex automatic document feeder 33 is relatively large on a left side in the drawing and is relatively small on a right side in the drawing which is a non-driving side of the duplex automatic document feeder 33. Therefore, of the first and second coil springs $220_1$, $220_2$, the first coil spring $220_1$ is provided at a position corresponding to, for example, the first shaft support member $43_1$ having a relatively large weight, and the second coil spring $220_2$ is provided inward of the second shaft support member $43_2$ having a relatively small weight in the width direction of the housing 31 of the duplex automatic document feeder 33, that is, closer to the first shaft support member $43_1$.

In the duplex automatic document feeder 33, as illustrated in FIG. 27A, the upper wall 312 of the housing 31 corresponding to the first and second coil springs $220_1$, $220_2$ is provided with abutting portions 312a each abutting against a corresponding one of the lower ends of the first and second coil springs $220_1$, $220_2$. The abutting portions 312a are convex portions protruding upward from a surface of the upper wall 312 of the housing 31. It is not necessary to provide the abutting portions 312a, and the lower ends of the first and second coil springs $220_1$, $220_2$ may directly abut against the upper wall 312 of the housing 31.

As illustrated in FIG. 27A, the first and second latch members $230_1$, $230_2$ are formed of synthetic resin, metal, or the like, and are plate-shaped members that have a required thickness and include substantially L-shaped side surfaces. Each of the first and second latch members $230_1$, $230_2$ is attached in a state of being fixed to the rotation shaft 211B in a recess (not illustrated) of the support plate portion 212B so as to abut against a corresponding one of centers of the first and second coil springs $220_1$, $220_2$ each having a circular shape in plan view.

The first and second latch members $230_1$, $230_2$ include an elongated flat plate-shaped shaft support portion 231 provided in a state of being fixed to the rotation shaft 211B, an elongated and substantially parallelogram-shaped holding portion 232 provided integrally with a lower end of the shaft support portion 231 in an inclined state, and a short plate-shaped latch portion 233 that is provided at a lower end of the holding portion 232 and is rotatable about a shaft 234. An upper end edge of the holding portion 232 of the first and second latch members $230_1$, $230_2$ provided in an inclined state abuts against side surfaces of the holding members 225 of the first and second coil springs $220_1$, $220_2$.

As illustrated in FIGS. 27B and 27C, the latch portion 233 of the first and second latch members $230_1$, $230_2$ is biased in the counterclockwise direction by a biasing portion such as a torsion spring (not illustrated) provided on the shaft 234. The latch portion 233 is held in a stopped state illustrated in FIG. 27C since a stopper 235 that is integrally provided and protrudes to an opposite side via the shaft 234 abuts against an abutting portion 236 provided at a lower end of the holding portion 232.

As illustrated in FIGS. 28A, 28B, and 28C, when an operator holds the operation lever 210B with a hand, a rotational force of the operation lever 210B in the counterclockwise direction is transmitted through the rotation shaft 211B, so that the first and second latch members $230_1$, $230_2$ are rotated in the counterclockwise direction together with the operation lever 210B. Then, when the latch portion 233 of the first and second latch members $230_1$, $230_2$ leaves the lower ends of the first and second coil springs $220_1$, $220_2$, a compressed state of the first and second coil springs $220_1$, $220_2$ due to the latch portion 233 is released, and the first and second coil springs $220_1$, $220_2$ extend to a free shape. At this time, the lower ends of the first and second coil springs $220_1$, $220_2$ abut against the abutting portion 312a provided on the upper wall 312 of the housing 31 of the duplex automatic document feeder 33, so that a pressing force acts to press down the abutting portion 312a. An upward push-up force acts on the duplex automatic document feeder 33 as a reaction force of the pressing force of the first and second coil springs $220_1$, $220_2$.

As shown in FIG. 6, the rotation moment M to be applied to the duplex automatic document feeder 33 by the first and second coil springs $220_1$, $220_2$ pushing up the duplex automatic document feeder 33 may be equal to or larger than the difference $\Delta M$ between the rotation moment $M_1$ required to open the duplex automatic document feeder 33 and the combined rotation moment $M_T$ to be applied to the duplex automatic document feeder 33 by a counter balance between the first and second shaft support members $43_1$, $43_2$. Therefore, it is not necessary for the first and second coil springs $220_1$, $220_2$ to apply a large rotation moment M to the duplex automatic document feeder 33, so that a small coil spring having a relatively small spring constant may be used, and the duplex automatic document feeder 33 is prevented from increasing in size.

When an operator releases a hand from the operation lever 210B, the first and second latch members $230_1$, $230_2$ rotate in the clockwise direction in the drawing by a biasing portion such as a torsion spring (not illustrated) provided on the rotation shaft 211B.

Figure 29A:
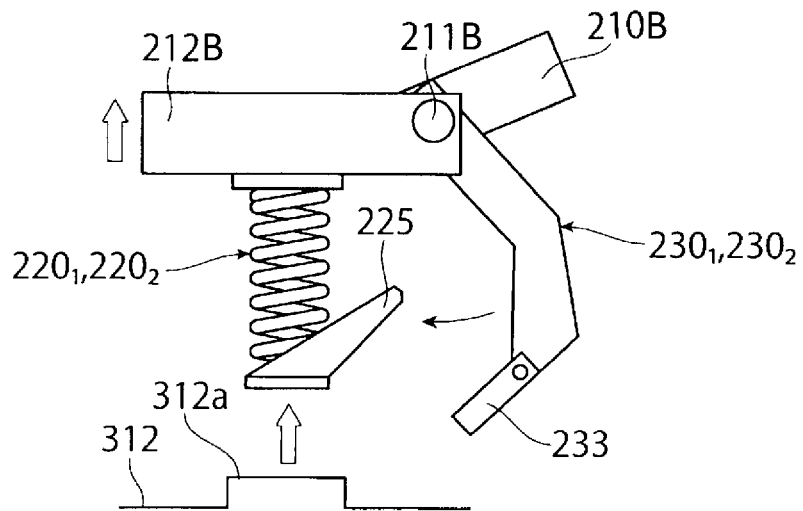
FIG. 29A is a configuration view illustrating a main part of the duplex automatic document feeder according to the fourth exemplary embodiment of the present invention.
Figure 29B:
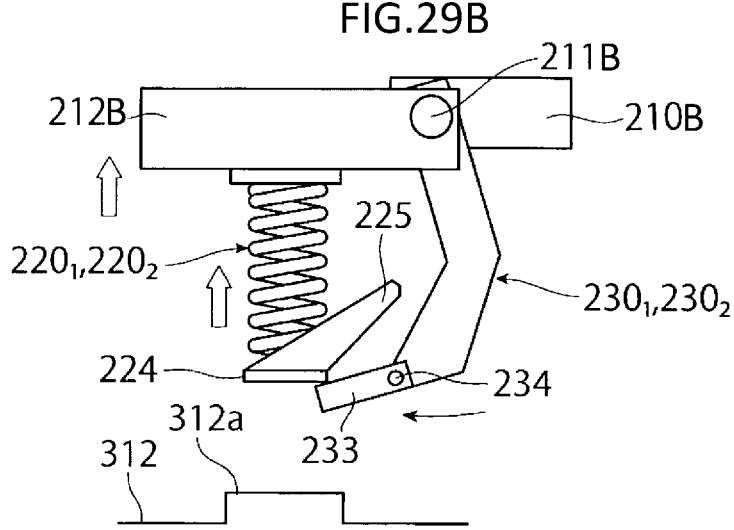
FIG. 29B is a configuration view illustrating a main part of the duplex automatic document feeder according to the fourth exemplary embodiment of the present invention.
Figure 29C:
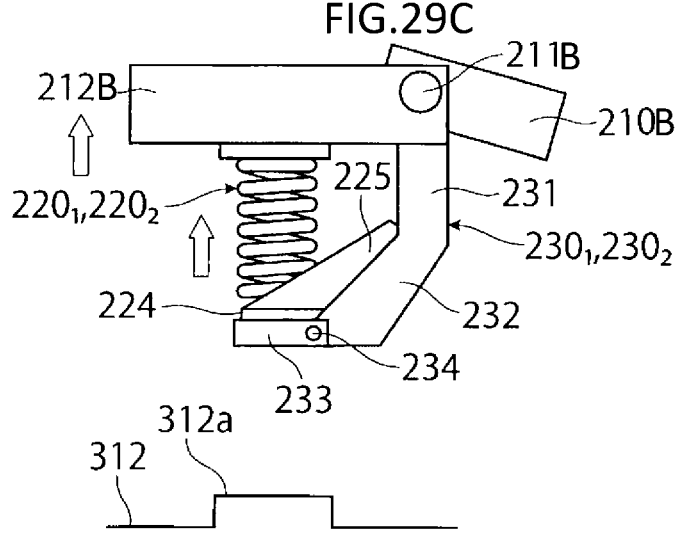
FIG. 29C is a configuration view illustrating a main part of the duplex automatic document feeder according to the fourth exemplary embodiment of the present invention.

When the first and second latch members $230_1$, $230_2$ rotate in the clockwise direction in the drawing, as illustrated in FIGS. 29A, 29B, and 29C, the latch portion 233 compresses and deforms the first and second coil springs $220_1$, $220_2$ via the buffer member 224B provided on lower end surfaces of the first and second coil springs $220_1$, $220_2$. The first and second latch members $230_1$, $230_2$ are stopped in a state in which the holding portion 232 abuts against the holding member 225 of the first and second coil springs $220_1$, $220_2$. Therefore, when an operator releases a hand from the operation lever 210B, the first and second latch members $230_1$, $230_2$ rotate in the clockwise direction in the drawing to compress and deform the first and second coil springs $220_1$, $220_2$ and stop.

<Operation of Image Reading Device>

In the image forming apparatus 1, to which the image reading device 3 according to the fourth exemplary embodiment is applied, as described below, when images of the documents 6 are copied or the images of the documents 6 are read and transmitted using a facsimile function or the like, it is possible to reduce an operation force when the document pressing portion is opened with a simple configuration as compared to a case in which a spring member is simply interposed between the document pressing portion and the apparatus body.

That is, in the image reading device 3 of the image forming apparatus 1, as illustrated in FIG. 4, when images of the documents 6 are read in the second reading mode, the duplex automatic document feeder 33 functioning as a document pressing portion is opened, the documents 6 are placed on the document table (the platen glass) 83 provided on the upper end surface of the housing 31 of the image reading device 3, and desired copy operation or the like is performed by the control panel 66 of the image forming apparatus 1 after the duplex automatic document feeder 33 has been closed.

According to operation designated by the control panel 66, the image reading device 3 reads images of the documents 6 by the image reading device 3, forms the images of the documents 6 on the recording sheets 5 by the image forming unit 2 of the image forming apparatus 1, transmits the images of the documents 6 read by the image reading device 3 to a personal computer (not illustrated), transmits the images of the documents 6 read by the image reading device 3 using a facsimile function, or the like.

In the image reading device 3 configured to read images of the documents 6, the duplex automatic document feeder 33 includes the sheet conveyance device 320 including a conveyance member configured to automatically convey the documents 6 in the first reading mode, the drive motor 321, and the like, so that the image reading device 3 has a relatively large weight. Therefore, in the image reading device 3, when the documents 6 are pressed by the duplex automatic document feeder 33 and images of the documents 6 are read while the documents 6 are placed on the document table 83, it is necessary for an operator to open and close the duplex automatic document feeder 33 having a relatively large weight.

Figure 30:
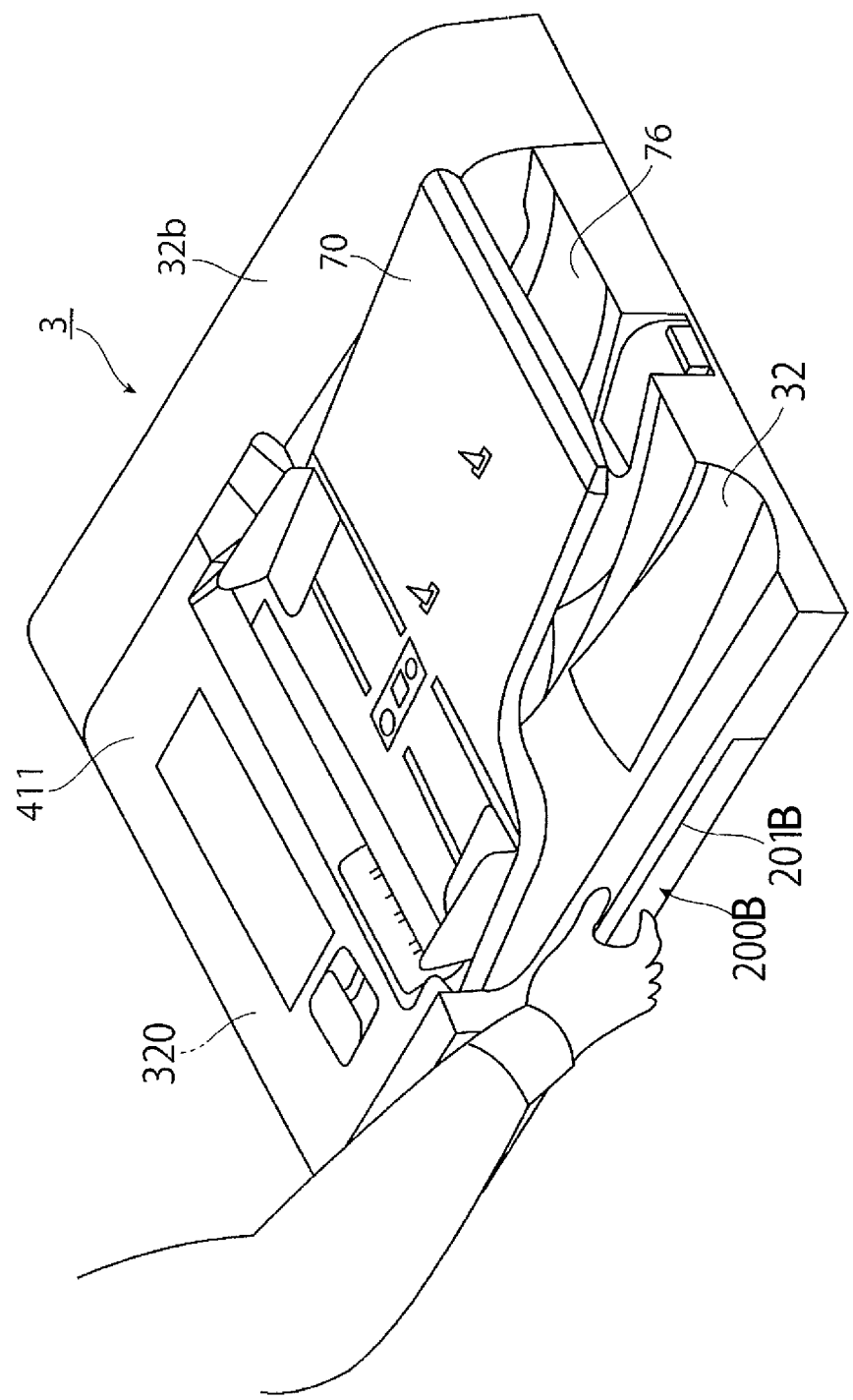
FIG. 30 is a perspective configuration view illustrating operation of opening the duplex automatic document feeder according to the fourth exemplary embodiment of the present invention.

In the image reading device 3 according to the fourth exemplary embodiment, as illustrated in FIG. 30, when opening the duplex automatic document feeder 33, an operator holds the operation portion 200B provided at the front end of the duplex automatic document feeder 33 with a hand.

Therefore, when an operator holds the operation portion 200B of the duplex automatic document feeder 33 with a hand, the operation lever 210B is rotated in the counterclockwise direction by the operator holding the operation lever 210B provided on the operation portion 200B with a hand. Then, the rotation shaft 211B, to which the operation lever 210B is fixed, rotates together with the operation lever 210B in the counterclockwise direction.

As illustrated in FIGS. 28A, 28B, and 28C, the first and second latch members $230_1$, $230_2$ similarly fixed to the rotation shaft 211B rotate together with the operation lever 210B in the counterclockwise direction to release a compression state of the first and second coil springs $220_1$, $220_2$ due to the latch portion 233. At this time, the lower ends of the first and second coil springs $220_1$, $220_2$ abut against the abutting portion 312a provided on the upper wall 312 of the housing 31 of the duplex automatic document feeder 33 to push up the duplex automatic document feeder 33 upward.

As illustrated in FIGS. 29A, 29B, and 29C, when an operator releases a hand from the operation lever 210B, the first and second latch members $230_1$, $230_2$ rotate in the clockwise direction in the drawing by a biasing portion such as a torsion spring (not illustrated) provided on the rotation shaft 211B.

When the first and second latch members $230_1$, $230_2$ rotate in the clockwise direction in the drawing, the latch portion 233 compresses and deforms the first and second coil springs $220_1$, $220_2$ via the buffer member 224B provided on the lower end surfaces of the first and second coil springs $220_1$, $220_2$. Therefore, when an operator releases a hand from the operation lever 210B, the first and second latch members $230_1$, $230_2$ rotate in the clockwise direction in the drawing to compress and deform the first and second coil springs $220_1$, $220_2$ and stop.

Therefore, when an operator releases operation of holding the operation lever 210B of the duplex automatic document feeder 33, operation of compressing and deforming the first and second coil springs $220_1$, $220_2$ is automatically performed. Therefore, it is not necessary for the operator to operate a certain member to push up the first and second coil springs $220_1$, $220_2$ to compress and deform the first and second coil springs $220_1$, $220_2$.

On the other hand, operation of closing the duplex automatic document feeder 33 is performed by the operator gripping the operation portion 200B. At this time, since an operator presses an upper part of the operation portion 200B of the duplex automatic document feeder 33 to close the duplex automatic document feeder, latching due to the first and second latch members $230_1$, $230_2$ is not released when the operation lever 210B is gripped.

A lock portion (not illustrated) configured to stop rotation of the first and second latch members $230_1$, $230_2$ even if the operation lever 210B is gripped after the duplex automatic document feeder 33 has been opened may be provided. At this time, the lock portion may be provided such that a locked state is released when the duplex automatic document feeder 33 is closed and lower ends of the first and second latch members $230_1$, $230_2$ abuts against the abutting portion 312a.

Therefore, according to the image reading device 3 in the fourth exemplary embodiment, it is possible to improve operability when the document conveyance device is opened with a simple configuration as compared with a case in which the first and second latch members $230_1$, $230_2$ configured to release compressive deformation of the restoring force applying unit by the operator performing gripping with a hand when opening the duplex automatic document feeder 33 are not provided.

In the above-described exemplary embodiment, the image reading device is applied to a color copying machine as an example of an image forming apparatus. However, the present invention is not limited thereto, and the image reading device may be used as a scanner, a fax machine, or the like.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image reading device comprising:
   a document pressing portion that is attached to an apparatus body and is configured to open or close to the apparatus body to press a document in between;
   a restoring force applying portion that is compressed and deformed to apply an elastic restoring force to the document pressing portion in an opening direction of the document pressing portion; and
   a releasing portion that releases compressive deformation of the restoring force applying portion by being grasped when the document pressing portion opens, the releasing portion comprising a compression and deformation portion configured to compress and deform the restoring force applying portion after the document pressing portion is opened.

2. The image reading device according to claim 1, wherein the releasing portion comprises a holding portion that is grasped to release the compressive deformation of the restoring force applying portion when the document pressing portion is opened.

3. The image reading device according to claim 2, further comprising
   an energization member configured to energize the releasing portion normally so as to compress and deform the restoring force applying portion and to hold a compressed and deformed state of the restoring force applying portion.

4. The image reading device according to claim 3, wherein the releasing portion is configured to compress and deform the restoring force applying portion when the releasing portion is released.

5. The image reading device according to claim 1, wherein the compression and deformation portion comprises a latch portion that is attached in a state of being bent toward the restoring force applying portion, and that is configured to hold the restoring force applying portion in a compressed and deformed state after the restoring force applying portion opens the document pressing portion.

* * * * *